(12) United States Patent
Inbe et al.

(10) Patent No.: US 7,811,366 B2
(45) Date of Patent: Oct. 12, 2010

(54) METAL SURFACE TREATMENT COMPOSITION, METAL SURFACE TREATMENT METHOD, AND METAL MATERIAL

(75) Inventors: Toshio Inbe, Tokyo (JP); Thomas Kolberg, Heppenheim (DE)

(73) Assignees: Nippon Paint Co., Ltd., Osaka (JP), part interest; Chemetall GmbH, Frankfurt am Main (DE), part interest ( * ) Notice: Subject to any disclaimer, the term of this patent is extended or adjusted under 35 U.S.C. 154(b) by 39 days.

(21) Appl. No.: 11/731,885

(22) Filed: Mar. 29, 2007

(65) Prior Publication Data

US 2008/0081212 A1    Apr. 3, 2008

Related U.S. Application Data

(63) Continuation of application No. PCT/JP2007/053973, filed on Mar. 1, 2007.

(30) Foreign Application Priority Data

Mar. 1, 2006    (JP)    ............... 2006-054859

(51) Int. Cl.
  *C23C 10/18*    (2006.01)
  *C23C 22/48*    (2006.01)
(52) U.S. Cl. .............. 106/14.15; 106/14.11; 148/247; 148/274; 148/279; 427/255.14; 427/255.18; 427/327
(58) Field of Classification Search .............. 106/14.11, 106/14.15; 148/247, 274, 279; 427/255.15, 427/255.18, 327
See application file for complete search history.

(56) References Cited

U.S. PATENT DOCUMENTS

| 5,053,081 | A | 10/1991 | Jacob |
| 6,179,934 | B1 | 1/2001 | Kawakami et al. |
| 6,475,300 | B2 * | 11/2002 | Shimakura et al. .......... 148/247 |
| 2004/0144451 | A1 | 7/2004 | Matsukawa et al. |

FOREIGN PATENT DOCUMENTS

| EP | 1433877 | 6/2004 |
| JP | 07-310189 | 11/1995 |
| JP | 09-501469 | 2/1997 |
| JP | 10-204649 | 8/1998 |
| JP | 2004-218070 | 8/2004 |
| JP | 2004/218072 | 8/2004 |
| WO | 95/05496 | 2/1995 |
| WO | 95/25831 | 9/1995 |

* cited by examiner

*Primary Examiner*—Roy King
*Assistant Examiner*—Lois Zheng
(74) *Attorney, Agent, or Firm*—Dilworth & Barrese LLP

(57) ABSTRACT

A metal surface treatment composition including at least one compound selected from the group consisting of a zirconium compound and a titanium compound, and an organosiloxane, which is a polycondensate of organosilane and has in a molecule thereof of at least two amino groups, in which the Degree of polycondensation of the organosiloxane is at least 40%, the content of at least one compound selected from the group consisting of the zirconium compound and the titanium compound is predetermined content, the content of the organosiloxane in the metal surface treatment composition is predetermined content, and the mass ratio of at least one element selected from the group consisting of the zirconium element and the titanium element contained in the zirconium compound and the titanium compound, respectively, to the silicon element contained in the organosiloxane is a predetermined ratio.

14 Claims, No Drawings

US 7,811,366 B2

METAL SURFACE TREATMENT COMPOSITION, METAL SURFACE TREATMENT METHOD, AND METAL MATERIAL

This application is a continuation of PCT/JP2007/053973, filed 1 Mar. 2007.

TECHNICAL FIELD

The present invention relates to a metal surface treatment composition for use in metal surface treatment, a metal surface treatment method for treating the surface of a metal material using the surface treatment composition, and a metal material treated with the metal surface treatment method.

BACKGROUND ART

When an article to be processed is to be coated, it is commonly subjected to surface treatment from the viewpoint of ensuring the corrosion resistance and adhesiveness of a coating film. In particular, when a metal (metal material, metal structure) is to be coated, the metal surface is subjected to chemical conversion treatment (surface treatment) for chemically forming a chemical conversion coating film.

An example of the chemical conversion treatment is chromate conversion treatment with a chromate containing composition; however, adverse effects of chromium have been noted. In recent years, a zinc phosphate treatment agent (zinc phosphate treatment) has been widely used as a chromium-free treatment agent (surface treatment agent, chemical conversion treatment agent) (see, for example, Patent Document 1).

However, the zinc phosphate treatment agent is highly reactive due to the high content of metal ions and acids that it contains, hence this treatment agent offers an unfavorable impact on both the cost and the workability during drainage treatment. In addition, metal surface treatment with the zinc phosphate treatment agent involves the generation and sedimentation of water-insoluble salts. Such precipitates are generally referred to as sludge, and the removal and disposal of sludge generates an additional undesirable cost. Furthermore, the use of phosphate ions is not preferable because they may affect the environment through eutrophication, and the treatment of phosphate ion effluent requires considerable labor. Moreover, metal surface treatment with the zinc phosphate treatment agent requires surface adjustment, which can prolong the total treatment process.

In addition to the zinc phosphate treatment agent and chromate conversion treatment agent, a chemical conversion treatment agent containing a zirconium compound is known (see, for example, Patent Document 2). The chemical conversion treatment agent, including a zirconium compound, contains less metal ions and acids, and hence is not as reactive. This offers a favorable cost advantage and improved workability during drainage treatment. Such a chemical conversion treatment agent is also superior to the above-described zinc phosphate treatment agent in regard to the inhibition of sludge generation.

However, the chemical conversion coating film formed with the treatment agent, including a zirconium compound, may not have better adhesiveness to a coating film obtained by cationic electro-deposition or the like, compared to that obtained with the use of a zinc phosphate treatment agent. Therefore, the treatment agent, including a zirconium compound, has been combined with phosphate ions or other components in order to improve its adhesive properties and corrosion resistance. However, the combination of phosphate ions can cause the above-described eutrophication.

Also provided is a chemical conversion treatment agent, which includes a zirconium compound and an amino group-containing silane coupling agent in order to improve the adhesiveness (for example, see Patent Document 3). Through the use of the chemical conversion treatment agent, zirconium serves as a film forming component of a chemical conversion coating film, and the amino group-containing silane coupling agent improves the adhesiveness between a chemical conversion coating film and a coating film by acting not only on the surface of the metal material, but also on the coating film formed after chemical conversion treatment.

[Patent Document 1] Japanese Unexamined Patent Application Publication No. H10-204649

[Patent Document 2] Japanese Unexamined Patent Application Publication No. H7-310189

[Patent Document 3] Japanese Unexamined Patent Application Publication No. 2004-218070

However, under the present circumstances where sophisticated surface treatment techniques are required, it has been an objective to develop a zirconium-based metal surface treatment composition which offers improved base metal concealing properties, coating film adhesiveness, and corrosion resistance.

Higher storage stability of the metal surface treatment composition is also demanded because if a metal surface treatment composition to be repeatedly used has poor storage stability, its effectiveness will deteriorate in a short period after being put to use, which will result in the failure of the formation of a chemical conversion coating film capable of offering original base metal concealing properties, coating film adhesiveness, and corrosion resistance. In particular, metal surface treatment compositions for large metal materials, such as automobile bodies or parts, are used in oversized treatment baths, and thus, it has been an objective to extend the lifespan of these compositions.

DISCLOSURE OF THE INVENTION

The present invention has been made in view of the above-described problems, and an objective thereof is to provide: a metal surface treatment composition including at least one of a zirconium and a titanium compound, capable of forming a chemical conversion coating film which can offer improved base metal concealing properties, coating film adhesiveness, and corrosion resistance, and having excellent storage stability; a metal surface treatment method for treating the surface of a metal material using the metal surface treatment composition; and a metal material treated with the metal surface treatment method.

The inventors of the present invention have thoroughly studied an approach that can be used to solve the above-described problems. As a result, it has been found that the above-described problems are solved by a zirconium and/or titanium-based metal surface treatment composition including an organosiloxane, which is a polycondensate of organosilane and has in a molecule thereof at least two amino groups, in which the content of the zirconium element and/or titanium element, the content of the organosiloxane, the mass ratio of the zirconium element and/or titanium element to the organosiloxane, and following Degree of polycondensation are specified, and the invention has been completed. More specifically, the invention provides the following.

According to a first aspect of the present invention, a metal surface treatment composition for use in metal surface treatment, including: at least one compound selected from the group of compounds consisting of a zirconium compound and a titanium compound; and an organosiloxane which is a polycondensate of organosilane and has in a molecule thereof at least two amino groups, in which the degree of polycondensation of the organosiloxane represented by the following formula (1) (hereinafter referred to as Degree of polycondensation) is at least 40%, the content of the compound selected from at least one compound of the group consisting of a zirconium compound and a titanium compound in the metal surface treatment composition is from 10 ppm to 10000 ppm with respect to the metal element, the content of the organosiloxane in the metal surface treatment composition is from 1 ppm to 2000 ppm with respect to the silicon element, and the mass ratio of the element selected from at least one element of the group consisting of a zirconium element and the titanium element contained in the zirconium compound and the titanium compound, respectively, to a silicon element contained in the organosiloxane is from 0.5 to 500.

[Formula 1]

Degree of polycondensation %=mass of organosiloxane×100/(mass of unreacted organosilane+mass of organosiloxane)   Formula (1)

in which the mass of organosiloxane refers to the mass of total of dimmers and larger multimers of the organosilane, and does not include the mass of unreacted organosilane.

In a second aspect of the metal surface treatment composition as described in the first aspect of the present invention, the mass ratio of total of trimers and larger multimers of the organosilane, to total of the unreacted organosilane and dimmers of the organosilane is one or more in the organosilane.

In a third aspect of the metal surface treatment composition as described in the first or second aspect of the present invention, the organosilane has two or more groups in total selected from amino groups and imino groups.

In a fourth aspect of the metal surface treatment composition as described in any one of the first to third aspects of the present invention, the organosiloxane is resistant to dissociation into organosilane.

In a fifth aspect of the metal surface treatment composition as described in the fourth aspect of the present invention, the organosilane has an amino group at an end thereof, and a silicon atom of silyl group is linked to a nitrogen atom of the amino group with four or more atoms in between.

In a sixth aspect of the metal surface treatment composition as described in either the fourth or fifth aspect of the present invention, the organosiloxane has one or more branched structure(s).

In a seventh aspect of the metal surface treatment composition as described in any one of the fourth to sixth aspects of the present invention, the ratio of silicon atoms bound to two or more other silicon atoms via oxygen atoms constituting the siloxane bond, to the total amount of the silicon atoms in the organosiloxane and the unreacted organosilane contained in the metal surface treatment composition, is at least 20 mole %, in the organosiloxane.

In an eighth aspect of the metal surface treatment composition as described in seventh aspect of the present invention, the ratio of silicon atoms bound to at least three other silicon atoms via oxygen atom constituting the siloxane bond, to the total amount of silicon atoms in the organosiloxane and the unreacted organosilane contained in the metal surface treatment composition, is at least 10 mole %, in the organosiloxane.

In a ninth aspect of the metal surface treatment composition as described in any one of the first to eighth aspects of the present invention, the metal surface treatment composition has a pH from 1.5 to 6.5.

In a tenth aspect, the metal surface treatment composition as described in any one of the first to ninth aspects of the present invention further includes a fluorine compound, the content of a free fluorine element in the metal surface treatment composition being from 0.01 ppm to 100 ppm.

In an eleventh aspect, the metal surface treatment composition as described in any one of the first to tenth aspects of the present invention further includes at least one oxidizing agent selected from the group consisting of nitric acid, nitrous acid, sulfuric acid, sulfurous acid, persulfuric acid, phosphoric acid, carboxylic acid group-containing compound, sulfonic acid group-containing compound, hydrochloric acid, bromic acid, chloric acid, hydrogen peroxide, $HMnO_4$, $HVO_3$, $H_2WO_4$, $H_2MoO_4$, and salts thereof.

In a twelfth aspect, the metal surface treatment composition as described in any one of the first to eleventh aspects of the present invention further includes at least one metal element selected from the group consisting of magnesium, zinc, calcium, aluminum, gallium, indium, copper, iron, manganese, nickel, cobalt, cerium, strontium, rare earth elements, tin, bismuth, and silver.

In a thirteenth aspect, the metal surface treatment composition as described in any one of the first to twelfth aspects of the present invention further includes at least one selected from the group consisting of nonionic surfactants, anionic surfactants, cationic surfactants, and ampholytic surfactants.

In a fourteenth aspect of the present invention, a metal surface treatment method for treating the surface of a metal material, includes: a treatment solution contact step of contacting a metal surface treatment solution, containing the metal surface treatment composition according to any one of the first to thirteenth aspects of the present invention, with the metal material; and a water washing step of washing the metal material with water after the treatment solution contact step.

In a fifteenth aspect of the metal surface treatment method as described in the fourteenth aspect of the present invention, the metal material is simultaneously subjected to a degreasing treatment during the treatment solution contact step.

In a sixteenth aspect of the metal surface treatment method as described in either the fourteenth or fifteenth aspect of the present invention, the metal material is electrolyzed as a cathode in the treatment solution contact step.

In a seventeenth aspect, the metal surface treatment method as described in any one of the fourteenth to sixteenth aspects of the present invention includes an acid contact step of contacting the metal material after the water washing step with an acidic aqueous solution containing at least one selected from the group consisting of cobalt, nickel, tin, copper, titanium, and zirconium.

In an eighteenth aspect, the metal surface treatment method as described in any one of the fourteenth to seventeenth aspects includes a polymer-containing solution contact step of contacting the metal material after the water washing step with a polymer-containing solution containing at least either of a water-soluble polymer compound and a water-dispersible polymer compound.

In a nineteenth aspect, the metal material is treated with the metal surface treatment method as described in any one of the fourteenth to eighteenth aspects of the present invention.

In a twentieth aspect, the metal material as described in the nineteenth aspect of the present invention, includes a surface treatment coating layer on the surface of a metal material selected from the group consisting an iron-based metal material and a zinc-based metal material, in which the surface treatment coating layer contains at least 10 mg/m² of at least one element selected from the group consisting a zirconium element and a titanium element, and at least 0.5 mg/m² of a silicon element.

In a twenty-first aspect, the metal material as described in nineteenth aspect of the present invention includes a surface treatment coating layer on the surface of metal material selected from the group including an aluminum-based metal material and a magnesium-based metal material, in which the surface treatment coating layer contains at least 5 mg/m² of at least one element selected from the group consisting a zirconium element and a titanium element, and at least 0.5 mg/m² of a silicon element.

In a twenty-second aspect of the metal material as described in either the twentieth or twenty-first aspects of the present invention, the mass ratio of at least one element selected from the group consisting the zirconium element and the titanium element to the silicon element is from 0.5 to 50.

According to a twenty-third aspect of the present invention, coating method for a metal material, in which a metal material is subjected to surface treatment by the metal surface treatment method according to any one of the fourteenth to eighteenth aspects of the present invention, and then subjected to coating.

According to the present invention, there is provided a zirconium and/or a titanium-based metal surface treatment composition including an organosiloxane, which is a polycondensate of organosilane and has in a molecule thereof at least two amino groups, in which the content of the zirconium element and/or the titanium element, the content of the organosiloxane, and the mass ratio of the zirconium element and/or the titanium element to the silicon element contained in the organosiloxane have been specified, and thereby provided is a metal surface treatment composition which offers improved base metal concealing properties, coating film adhesiveness, and corrosion resistance, and has excellent storage stability.

Also provided is a metal surface treatment method for treating the surface of a metal material using the metal surface treatment composition, a metal material treated with the metal surface treatment method, and a coating method for the metal material.

PREFERRED MODE FOR CARRYING OUT THE INVENTION

An embodiment of the invention is described in detail below.

<Metal Surface Treatment Composition>

A metal surface treatment composition according to the embodiment is used for metal surface treatment, and includes a zirconium compound and/or titanium compound, and an organosiloxane having amino groups.

Further, the metal surface treatment composition according to the embodiment is diluted with water, and adjusted to make a metal surface treatment solution, which is used for metal surface treatment.

[Zirconium Compound and/or Titanium Compound Component]

Zirconium and/or titanium derived from the zirconium compound and/or titanium compound component contained in the metal surface treatment composition is a component for forming a chemical conversion coating film. The formation of a chemical conversion coating film including zirconium and/or titanium on a metal material allows the improvement of corrosion resistance and abrasion resistance of the metal material.

When a metal material is subjected to surface treatment with the metal surface treatment composition including zirconium and/or titanium according to the embodiment, the metal constituting the metal material causes dissolution. Upon the occurrence of metal dissolution reaction in the presence of zirconium fluoride and/or titanium fluoride, hydroxides or oxides of zirconium and titanium are generated by the abstract of fluorine from $ZrF_6^{2-}$ and $TiF_6^{2-}$, respectively, by metal ions eluted into the metal surface treatment composition, and the increase of pH at the interface. Subsequently, hydroxides or oxides of zirconium and/or titanium deposit on the surface of the metal material. The metal surface treatment composition according to the embodiment is a reactive chemical conversion treatment agent, and hence, it is useful for chemical conversion treatment of a metal material of complicated shape. Further, chemical reaction produces a chemical conversion coating film firmly bonded to a metal material, which may be subjected to water washing after the chemical conversion treatment.

The zirconium compound is not particularly limited, and examples thereof include alkali metal fluorozirconates such as $K_2ZrF_6$, fluorozirconates such as $(NH_4)_2ZrF_6$, soluble fluorozirconates such as $H_2ZrF_6$, zirconium fluoride, zirconium oxide, zirconyl nitrate, and zirconium carbonate and the like.

The titanium compound is not particularly limited, and examples thereof include alkali metal fluorotitanates, fluorotitanates such as $(NH_4)_2TiF_6$, soluble fluorotitanates like fluorotitanic acids such as $H_2TiF_6$, titanium fluoride, titanium oxide and the like.

[Content of Zirconium and/or Titanium]

The content of zirconium and/or titanium in the metal surface treatment composition according to the embodiment is within the range from 10 ppm to 10000 ppm with respect to the metal element. If the content is less than 10 ppm, a sufficient amount of coating cannot be provided on a metal material, and if it is more than 10000 ppm, no further improvement is expected and cost efficiency decreases. The content is more preferably from 50 ppm to 1000 ppm with respect to the metal element, and more preferably from 50 ppm to 600 ppm with respect to the metal element.

[Organosiloxane]

The metal surface treatment composition according to the embodiment includes an organosiloxane which is a polycondensate of organosilane and has in a molecule thereof of at least two amino groups. Examples of the organosilane include those represented by the following general formula (1):

[Chem 1]

in which m is 0, 1, or 2; $R^1$ is —Cl, —SH, —N=C=O, —NH₂, —CH=CH₂, or a substituent represented by the following chemical formulae (2) to (9), and general formula (10); $R^2$ represents an alkylene group or aminoalkyl group having one to six carbon atoms; $R^3$ represents —OH, —OR⁵, or —$R^6$ ($R^5$ and $R^6$ each represent an alkyl group having one to six carbon atoms); and $R^4$ represents an alkyl group having one to three carbon atoms:

[Chem 2]

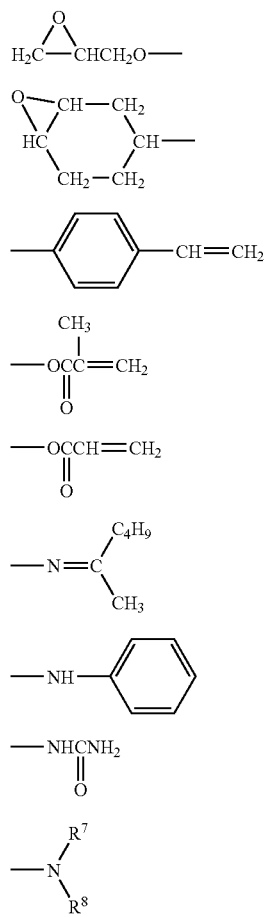

in which $R^7$ is a hydrogen atom, an aminoalkyl group having one to six carbon atoms, or an alkyl group having one to six carbon atoms; and $R^8$ represents a hydrogen atom or an aminoalkyl group having one to six carbon atoms.

Specific examples of the organosilane include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-(2-aminoethyl)-3-aminopropylmethyldimethoxysilane, N-(2-aminoethyl)-3-aminopropyltrimethoxysilane, N-2(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, hydrochloride of N-(vinylbenzyl)-2-aminoethyl-3-aminopropyltrimethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanate propyltriethoxysilane and commercially available amino group-containing silane coupling agents. As the silane coupling agents which can be used are such as KBM-403, KBM-602, KBM-603, KBE-603, KBM-903, KBE-903, KBE-9103, KBM-573 (manufactured by Shin-Etsu Chemical Co., Ltd.), and XS1003 (manufactured by Chisso Corporation).

The organosiloxane acts on both of the surface of metal material and coating film formed after metal surface treatment, to improve the adhesiveness between them. It is assumed that the effect is produced as follows: the alkoxy group in the organosiloxane is hydrolyzed to generate a silanol, which acts on the surface of the metal material through hydrogen bonds; and amino groups of the organosiloxane act on the coating film through chemical bonds or hydrogen bonds, which improves the adhesiveness between the coating film and the metal material. More specifically, the organosiloxane contained in the chemical conversion coating film acts on both the metal material and coating film to improve the adhesiveness between them.

The organosiloxane having at least two amino groups in a molecule thereof is obtained by polycondensation of an organosilane having an amino group. The organosiloxane may be monocondensate or cocondensate. However, in cases where the organosiloxane is a cocondensate, it is only necessary that at least one organosilane of the at least two organosilanes used has an amino group. The metal surface treatment composition may acquire the characteristics based on functional groups other than an amino group, if the organosiloxane is prepared to have at least two amino groups by cocondensation of amino group-free organosilane, and amino group-containing organosilane.

An organosilane containing an imino group and/or amino group is included as the organosilane containing the amino group. In the above-mentioned general formula (1), it corresponds to organosilanes, in which $R^1$ is an amino group or a group of atoms containing an amino group, and $R^2$ is imino group or a group of atoms containing an imino group. By employing an organosilane containing a terminal amino group, or the organosilane containing above-mentioned imino group, it is thought that the resultant adhesiveness with the coating film described above can be obtained. However, it is thought that the most dramatic results are achieved by using an organosilane containing a terminal amino group.

In the organosiloxane of the present embodiment, it is preferable that the organosilane contains a total of at least two of the amino groups and/or the imino groups in one molecule. Since the number of amino groups and/or imino groups in the organosiloxane can be increased by using an organosilane containing at least two amino groups bonded to a terminus, it is thought that the adhesiveness with the coating film can be further improved as described above.

The amino-group containing organosilane of the above general formula (1) is preferably N-(2-aminoethyl)-3-aminopropyltrimethoxysilane, in which m is 0; $R^1$ is —$NHC_2H_4NH_2$; $R^2$ is —$C_3H_6NHC_2H_4$—; and $R^4$ is a methyl group, 3-aminopropyltriethoxysilane, in which m is 0; $R^1$ is —$NH_2$; $R^2$ is a propylene group; and $R^4$ is a methyl group, N-(2-aminoethyl)-3-aminopropyltriethoxysilane, and 3-aminopropyltrimethoxysilane.

Examples of the organosiloxane which is a polycondensate of these organosilanes and has in a molecule thereof of at least two amino groups include those represented by the following general formulae (11) to (15), and also include pentamer or larger organosiloxanes. In the following general formulae (11) to (15), R represents —$C_3H_6NHC_2H_4NH_2$, or —$C_3H_6NH_2$ and such.

[Chem 3]

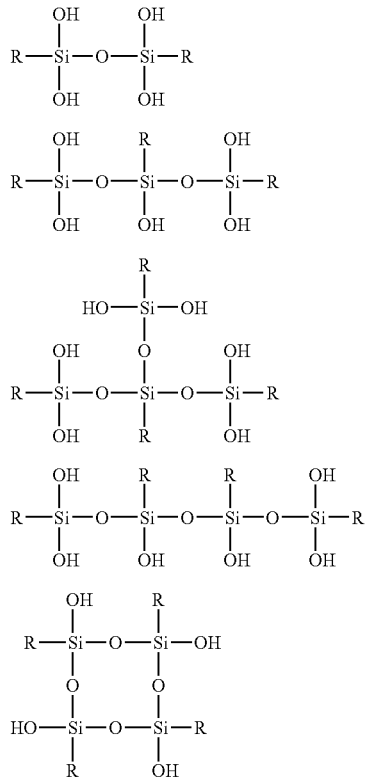

The organosiloxane according to the embodiment has in a molecule thereof at least two amino groups. The at least two amino groups of the organosiloxane are considered to improve the adhesiveness to the coating film, and the basicity of the amino groups facilitates coprecipitation of the organosiloxane to deposit in the coating film during the formation of a chemical conversion coating film of zirconium or titanium. Accordingly, the film deposition and the adhesiveness can be improved with the metal surface treatment composition including an organosiloxane which is a monocondensate of the organosilane represented by the above general formula (1), or cocondensate of the organosilane represented by the above general formula (1).

The organosiloxane used in the embodiment is a polycondensate of the organosilane represented by the above general formula (1) and has in a molecule thereof at least two amino groups. Therefore, once it is polymerized, it is considered not to be readily hydrolyzed to monomers by dilution. The reason that the organosiloxane is stable in an aqueous solution is considered that the binding energy of Si—O—Si in the organosiloxane is significantly higher than the binding energy of Si—O—C. Further, the reason that the organosiloxane having amino groups is stable in an aqueous solution is considered that silanol is neutralized by amino groups, and unpaired electrons on nitrogen atoms coordinate on silicon atoms to relieve polarization in silanol. It is speculated that these effects are exerted by the above-described imino groups, as well as the above-described terminal amino groups. Accordingly, the organosiloxane is relatively stable even if it is mixed in the metal surface treatment composition, and hence, it is effectively incorporated into a chemical conversion coating film to contribute to the improvement of the adhesiveness of the chemical conversion coating film.

The metal surface treatment composition of the embodiment may further include the unreacted organosilane in the polycondensation reaction of the organosiloxane. The unreacted organosilane means an organosilane has not undergone the polycondensation reaction, and also includes an organosilane generated by hydrolysis of organosiloxane, once generated by the polycondensation.

In common with the organosiloxane, the unreacted organosilane includes amino group-containing organosilane. Therefore, once it is incorporated into a chemical conversion coating film, it will contribute to the improvement of the adhesiveness of the film. However, the unreacted organosilane is less prone to being incorporated into a chemical conversion coating film than the organosiloxane. This seems to be because an organosiloxane is polycondensed, thus having more amino groups in a molecule than organosilane; therefore, due to the above-described effect of amino groups, an organosiloxane more readily coprecipitates to deposit in a chemical conversion coating film of zirconium or titanium during film formation than organosilane. Accordingly, in the case where the unreacted organosilane is contained as described in the embodiment, the Degree of polycondensation of the organosiloxane represented by the following formula (1) is an important factor for improving the adhesiveness. More specifically, the adhesiveness can be improved by appropriately controlling the Degree of polycondensation of organosiloxanes:

[Formula 2]

Degree of polycondensation %=mass of organosiloxane×100/(mass of unreacted organosilane+mass of organosiloxane)　　　Formula (1)

in which, the mass of organosiloxane refers to the mass of total of dimers and larger multimers of the organosiloxane, and does not include the mass of the unreacted organosilane.

Specifically, the Degree of polycondensation is preferably at least 40%. If the Degree of polycondensation is less than 40%, the amount of organosiloxane incorporated into the film is decreased, which may result in failure to improve the adhesiveness. The Degree of polycondensation is preferably at least 50%, more preferably at least 70%, and most preferably at least 80%.

The Degree of polycondensation of organosiloxanes is evaluated by measuring an organosiloxane with $^{29}$Si—NMR. More specifically, when organosilane as a raw material is $R^9$—Si $(OR^{10})_3$ (where $R^{10}$ is an alkyl group), or $R^9$—Si $(OR^{10})_m(OH)_{3-m}$ (where m is 0, 1, 2, or 3) in the reacted solution, where the silicon atoms do not bind to the other silicon atoms which constitute the organosiloxane, they are regarded as the unreacted organosilane (monomer), while the remainder is regarded as polycondensed organosiloxane, and the Degree of polycondensation is determined by the formula (1) described above.

In organosiloxane, the mass ratio of total of trimers and larger multimers of the organosilane, to total of the unreacted organosilane and dimmer for the organosilane is preferably one or more. When the mass ratio is one or more, trimers or larger multimers having in a molecule thereof at least two amino groups is increased, which may result in further improvement of the adhesiveness. Evaluation of dimers and multimers (polymers) of organosilane is also conducted by measurement with $^{29}$Si—NMR as is the case with the evaluation of the Degree of polycondensation.

The organosiloxane is not particularly limited as to its molecular weight, but is preferably a dimer, and more preferably a trimer or larger multimer for facilitating the incorporation into hydroxides or oxides of zirconium and/or titanium, and improving the adhesiveness with coating film. Therefore, the organosilane polycondensation reaction is preferably performed under conditions which facilitate hydrolysis and polycondensation of organosilanes. The conditions which facilitate hydrolysis and polycondensation of organosilanes are, for example, reaction conditions including alcohol as a solvent, or reaction conditions which are more suitable to the above-described cocondensation than monocondensation. Further, when the reaction occurs under conditions where the concentration of organosilane is relatively high, organosiloxane having a higher molecular weight and higher Degree of polycondensation is obtained. Specifically, the polycondensation reaction is preferably performed under conditions where the concentration of organosilane is within the range from 5% to 70% by mass. The concentration of organosilane is more preferably from 5% to 50% by mass, even more preferably from 5% to 40% by mass, and still further preferably from 5% to 30% by mass.

In addition to the above-mentioned adhesiveness, the organosiloxane is preferably resistant to dissociation into organosilane for producing a metal surface treatment composition having good storage stability.

The organosiloxane which is resistant to dissociation into organosilane refers to those less prone to undergo hydrolysis of siloxane bonds, or those less prone to become organosilane monomer completely, even if organosiloxane undergoes hydrolysis. Specifically that refers to an organosiloxane having a chemical structure which is resistant to the hydrolysis, or an organosiloxane which is resistant to dissociation into organosilane monomers even subjected to one time hydrolysis only.

Examples of the organosiloxane which is resistant to dissociation into organosilane include:

(i) an organosiloxane which is a polycondensate of organosilane in which a nitrogen atom of terminal amino group is linked to a silicon atom of a silyl group with four or more atoms in between;

i.e.) an organosiloxane which is polycondensate of organosilane in which a nitrogen atom of terminal amino group is separated from a silicon atom of silyl group by four or more atoms;

(ii) organosiloxane having one or more branched structure(s); and (iii) organosiloxane in which the ratio of silicon atoms which bind to two or more other silicon atom through the oxygen atom constituting the siloxane binding, to the total amount of the silicon atoms in the organosiloxane and the unreacted organosilane, which are contained in metal surface treatment composition, is at least 20 mole %, in the organosiloxane.

(i) The organosiloxane which is a polycondensate of organosilane in which a nitrogen atom of a terminal amino group is four or more atoms separated from a silicon atom of a silyl group refers to a polycondensate of organosilane represented by the following general formula (16), in which at least four atoms are bonded as $R^{11}$.

[Chem 4]

$$NH_2-R^{11}-Si-(OR^{12})_3 \quad (16)$$

For example, $R^{11}$ is an alkylene chain having at least four carbon atoms in the main chain, or an aminoalkyl chain which is generated by substituting one alkylene chain, included as part of the main chain of the above-mentioned alkylene chain, with an imino group. $R^{12}$ is an alkyl group having one to three carbon atoms or hydrogen atom.

Examples of the organosiloxane as described in (i) include those generated using organosilane, such as N-(2-aminoethyl)-3-aminopropylmethyldimethoxysilane, N-(2-aminoethyl)-3-aminopropyltrimethoxysilane, and N-(2-aminoethyl)-3-aminopropyltriethoxysilane. Each of these organosilanes has nitrogen atom of terminal amino group linked to a silicon atoms of silyl groups with six atoms in between. Therefore, by using these organosilanes, the storage stability of the metal surface treatment composition can be improved. Moreover, since each of these organosilanes has a terminal amino group, and imino group, the adhesiveness with coating film is improved by the effects of these groups, as described above.

The mechanism by which the organosiloxane is used to improve the storage stability of the metal surface treatment composition is speculated as follows. In case the silicon atom of the silyl group is linked to the nitrogen atom of the terminal amino group with three or less atoms in between, the siloxane bond is assumed to be hydrolyzed by the terminal amino group in a dilute aqueous solution. Accordingly, the organosilane becomes independently even more stable than organosiloxane, and the dissociation of the organosiloxane is thought to proceed easily. However, in case the silicon atom of the silyl group is linked to the nitrogen atom of the terminal amino group with four or more atoms in between, it is difficult to form a structure in which the siloxane is easily hydrolyzed by the terminal amino group. Accordingly, the dissociation of organosiloxane hardly proceeds.

Here, as the organosiloxane, it may also be preferable to use cocondensate of organosilane containing the nitrogen atom of the terminal amino group being linked to the silicon atom of the silyl group with three or less atoms in between, and an organosilane containing the nitrogen atom of the terminal amino group being linked to the silicon atom of the silyl group in four or more atoms in between. More specifically, the organosiloxane of the cocondensate of the organosilane, in which the nitrogen atom of the terminal amino group is linked to the silicon atom of the silyl group with six or more atoms in between, such as N-(2-aminoethyl)-3-aminopropylmethyldimethoxysilane, N-(2-aminoethyl)-3-aminopropyltrimethoxysilane, or N-(2-aminoethyl)-3-aminopropyltriethoxysilane, and an organosilane, in which the nitrogen atom of the terminal amino group is linked to the silicon atom of the silyl with three atoms in between, such as 3-aminopropyltrimethoxysilane, or 3-aminopropyltriethoxysilane, may also be preferable.

(ii) The organosiloxane having one or more branched structure(s) refers to an organosiloxane not having a straight chain structure, but a branched structure through polycondensation of organosilanes, or an organosiloxane composed of branched organosilane. Examples of the former include the structures represented by the above general formulae (13) and (15), and also include pentamer or larger organosiloxanes.

The mechanism by which the organosiloxane improves the storage stability of the metal surface treatment composition is assumed as follows. In case that the organosiloxane has one or more branched structure(s), the siloxane bond thereof has a steric structure that is difficult to be hydrolyzed by steric hindrance. Alternatively, the organosiloxane having a branched structure is not completely dissolved by hydrolization of only one time.

In order to obtain the organosiloxane having the branched structure, it is effective to make the concentration of the organosilane at least 3% by mass and/or to adjust the pH to 6 to 14 during the polycondensation reaction. When the concentration of the organosilane is lower than 3% by mass, condensation may be difficult, and when the pH is lower than 6, polycondensation in straight chains continues easily. As the concentration of the organosilane during the polycondensation reaction, at least 5% by mass is preferable, and at least 10% by mass is even more preferable. As the pH of the organosilane during the polycondensation reaction, a pH of 7 to 13 is preferable, and a pH of 8 to 13 is even more preferable.

(iii) The silicon atom bounds to at least two other silicon atoms via oxygen atoms constituting the siloxane bond are exemplified as follows. In cases where the organosiloxane is a polycondensate of the organosilane having three alkoxy groups which bind to a silicon atom, specifically the organosiloxane is the polycondensate of the organosilane presented by above-mentioned general formula (1), in which m is 0, "the silicon atom which binds to at least two other silicon atoms via the oxygen atoms constituting the siloxane bond in the organosiloxane," corresponds to the silicon atom having three silanol groups generated by the hydrolyzation of the alkoxy groups, one of which does not generate the siloxane bond by condensation.

Therefore, for example, in the organosiloxane represented by the above-mentioned general formulae (11) to (15), central silicon atom in general formula (12), the central two silicon atoms, excluding those of both ends in general formula (14), and all four silicon atoms in general formula (15) fall under the category.

In addition, "the silicon atom which binds to at least three other silicon atoms via the oxygen atoms constituting the siloxane bond in the organosiloxane," corresponds to the silicon atom having three silanol groups generated by the hydrolyzation of the alkoxy groups, all of which generate the siloxane bond by condensation.

Therefore, for example, in the organosiloxane represented by the above-mentioned general formula (13), the central silicon atom excluding the terminal three silicon atoms falls under the category.

In cases where the organosiloxane is the polycondensate of organosilane having two alkoxy groups which bind to silicon atoms, specifically the organosiloxane is the polycondensate of the organosilane represented by the above-mentioned general formula (1), in which m is 1, "the silicon atom which binds to at least two other silicon atoms via oxygen atoms constituting the siloxane bond in the organosiloxane," corresponds to the silicon atom having two silanol groups generated by the hydrolyzation of the alkoxy groups, all of which generate the siloxane bond by condensation.

The existence of "the silicon atom which binds to at least two other silicon atoms via oxygen atoms constituting the siloxane bond in the organosiloxane," indicates that the organosiloxane is trimers or larger multimers. The organosiloxane having a high ratio of multimers which are trimer or larger multimers contributes to an improvement in the storage stability of the metal surface treatment composition, as well as an improvement in the adhesiveness. The mechanism to improve the storage stability is speculated that the siloxane bond has a steric structure that is difficult to be hydrolyzed, or the organosiloxane is not completely dissolved into organosilane by single hydrolyzation.

The ratio of "the silicon atom which binds to at least two other silicon atoms via oxygen atoms constituting the siloxane bond in the organosiloxane," to silicon atoms contained in the organosiloxane and the unreacted organosilane, contained in the metal surface treatment composition, is preferably 25 mole % or more, more preferably 30 mole % or more, even more preferably 35 mole % or more, and most preferably 40 mole % or more.

The storage stability is thought to be improved by increasing degree of polymerization of organosiloxane, as described above. Therefore, the ratio of "the silicon atom which binds to at least three other silicon atoms via oxygen atoms constituting the siloxane bond in the organosiloxane" to silicon atoms contained in the organosiloxane and the unreacted organosilane, contained in the metal surface treatment composition, is preferably 10 mole % or more, more preferably 15 mole % or more, even still more preferably 20 mole % or more, even more preferably 30 mole % or more, and most preferably 50 mole % or more.

As long as organosiloxane fulfills any one of above-mentioned criteria of (i), (ii), or (iii), the metal surface treatment composition with improved storage stability is obtained, even without fulfilling any of the other criteria of (i), (ii), or (iii). However, it is preferred that two or more criteria of (i), (ii), and (iii) are fulfilled.

The organosiloxane is more preferably the organosiloxane such as described in (ii) and (iii). This is because tetramers or larger multimers having one or more branched structure(s) take a structure which is more resistant to dissociation.

The organosiloxane is more preferably the organosiloxane as described in (i) and (ii), and/or the organosiloxane as described in (iii). In this case, the organosiloxane has a structure which is resistant to dissociation into organosilane, and has an effect due to four or more atoms in main chain between a nitrogen atom of the terminal amino group and a silicon atom of a silyl group.

The content of the organosiloxane in the metal surface treatment composition of the embodiment is from 1 ppm to 2000 ppm with respect to the silicon element. If the content is less than 1 ppm, the adhesiveness is deteriorated, and if more than 2000 ppm, no further improvement is expected and cost efficiency is deteriorated. The content is more preferably from 5 ppm to 500 ppm, and further preferably from 10 ppm to 200 ppm.

[Mass Ratio of Zirconium Element and/or Titanium Element to Silicon Element]

The mass ratio of the zirconium element and/or titanium element contained in the zirconium compound and/or titanium compound to the silicon element contained in the organosiloxane is from 0.5 to 500. If the mass ratio is less than 0.5, the formation of a chemical conversion coating film by zirconium and/or titanium is inhibited, and film formation by organosiloxane is also inhibited, which deteriorates the adhesiveness and corrosion resistance. On the other hand, if the mass ratio is more than 500, the organosiloxane is not sufficiently incorporated into the film and fails to exhibit adhesiveness.

The metal surface treatment composition may contain the unreacted organosilane in the polycondensation reaction of the organosiloxane. The content of the silicon element in the content of organosiloxane and in the mass ratio of the zirconium element and/or titanium element to the silicon element refers to the content of the silicon element including the above organosilanes with respect to the silicon element.

[Free Fluorine Component]

The metal surface treatment composition according to the embodiment may further include a fluorine compound. The fluorine element derived from the fluorine compound serves as an etching agent for a metal material, and a complexing agent for zirconium and/or titanium. The fluorine compound as a fluorine element source is not particularly limited, and examples thereof include fluorides such as hydrofluoric acid, ammonium fluoride, fluoboric acid, ammonium hydrogenbifluoride, sodium fluoride, and sodium hydrogenfluoride. Further, a fluoride complex such as hexafluorosilicate may be a supply source, and specific examples thereof include hydrofluosilic acid, zinc hydrofluorosilicate, manganese hydrofluorosilicate, magnesium hydrofluorosilicate, nickel hydrofluorosilicate, iron hydrofluorosilicate, and calcium hydrofluorosilicate.

[Content of Free Fluorine Component]

The content of the free fluorine element in the metal surface treatment composition according to the embodiment is preferably from 0.01 ppm to 100 ppm. The term "the content of the free fluorine element" means the concentration of free fluorine ions in the metal surface treatment composition, and is determined by measurement with a meter having a fluorine ion electrode. If the content of the free fluorine element in the metal surface treatment composition is less than 0.01 ppm, the composition may become unstable and cause sedimentation, and its etching ability may be too low to achieve sufficient film formation. On the other hand, if the content is more than 100 ppm, etching may be excessive and hinder sufficient film formation by zirconium. The content of the free fluorine element in the metal surface treatment composition is more preferably from 0.1 ppm to 20 ppm.

[pH of Metal Surface Treatment Composition]

The metal surface treatment composition used in the embodiment preferably has a pH from 1.5 to 6.5. When the pH is less than 1.5, excessive etching may hinder sufficient film formation, and an uneven film may be formed that adversely affects the appearance of the coating film. On the other hand, if the pH is higher than 6.5, etching is insufficient to form a favorable chemical conversion coating film. The pH is preferably from 2.0 to 5.0, and more preferably from 2.5 to 4.5. The pH of the metal surface treatment composition may be appropriately adjusted with an acidic compound such as nitric acid and sulfuric acid, and a basic compound such as sodium hydrate, potassium hydroxide, and ammonia.

[Surfactant]

The metal surface treatment composition according to the embodiment may further include nonionic surfactants, anionic surfactants, cationic surfactants, and amphoteric surfactants. The nonionic surfactants, anionic surfactants, cationic surfactants, and amphoteric surfactants may be known ones. In the case where the metal surface-treatment composition used in the embodiment includes the above surfactants, a favorable film is formed with no necessity for degreasing and cleansing of the metal material in advance.

[Metal Element]

The metal surface treatment composition according to the embodiment may include a metal element which is capable of imparting adhesiveness and corrosion resistance to the coating film. Examples of the metal element which may be contained in the metal surface treatment composition as a chemical conversion treatment agent include magnesium, zinc, calcium, aluminum, gallium, indium, copper, iron, manganese, nickel, cobalt, cerium, strontium, rare earth elements, tin, bismuth, and silver.

[Oxidizing Agent]

The metal surface treatment composition according to the embodiment may further include an oxidizing agent for promoting the film formation reaction. Examples of the oxidizing agent which may be contained in the metal surface treatment composition include nitric acid, nitrous acid, sulfuric acid, sulfurous acid, persulfuric acid, phosphoric acid, carboxylic acid group-containing compounds, sulfonate group-containing compounds, hydrochloric acid, bromic acid, chloric acid, hydrogen peroxide, $HMnO_4$, $HVO_3$, $H_2WO_4$, and $H_2MoO_4$, and salts of these oxygen acids.

<Metal Surface Treatment Method>

The metal surface treatment method of the embodiment is conducted by contacting a metal surface treatment solution containing the metal surface treatment composition according to the embodiment with a metal material. More specifically, the metal surface treatment method according to the embodiment includes a treatment solution contact step of contacting a metal surface treatment solution containing the metal surface treatment composition with a metal material. Examples of the method for contacting the treatment solution include a dipping method, spray method, roll coat method, and flow coating.

[Surface Treatment Conditions]

The treatment temperature in the surface treatment is preferably within the range of 20° C. to 70° C. If the temperature is lower than 20° C., sufficient film formation may not be achieved, and inconveniences may occur, such as the necessity to control temperature during the summer season. On the other hand, if the temperature is higher than 70° C., no further improvement is expected and cost efficiency decreases. The treatment temperature is more preferably within the range from 30° C. to 50° C.

The treatment time for the surface treatment is preferably within the range from 2 seconds to 1100 seconds. If the time is less than 2 seconds, it is difficult to obtain a sufficient amount of coating, and a treatment time longer than 1100 seconds may be pointless because no further improvement is expected. The treatment time is more preferably within the range from 30 seconds to 120 seconds.

The metal surface treatment method according to the embodiment is different from the conventional chemical conversion treatment method with a zinc phosphate chemical conversion treatment agent in that it does not require surface adjustment treatment in advance. This allows chemical conversion treatment of a metal material with fewer processes.

Further, in the metal surface treatment method according to the embodiment, a metal material may be electrolyzed as a cathode. In this case, hydrogen is reduced at the interface of the metal material as a cathode to increase the pH. With the increase of pH, stability of the compound containing the zirconium and/or titanium element decreases at the interface of the cathode, by which a surface treatment film deposits as an oxide or hydroxide containing water.

[Metal Material]

The metal material for use in the metal surface treatment method according to the embodiment is not particularly limited, and examples thereof include a steel sheet and aluminum plate. Steel sheet is not particularly limited and includes cold-rolled steel, hot-rolled steel, mild steel, or high tensile steel, and also include iron-based base materials (iron-based metal materials), aluminum-based base materials (aluminum-based metal materials), zinc-based base materials (zinc-based metal materials), and magnesium-based base materials (magnesium-based metal materials). Iron-based base materials refer to base materials (metal materials) including iron and/or iron alloy, aluminum-based base materials refer to base materials (metal materials) including aluminum and/or aluminum alloy, and zinc-based base materials refer to base materials (metal materials) including zinc and/or zinc alloy. Magnesium-based base materials refer to base materials (metal materials) including magnesium and/or magnesium alloy.

Furthermore, the metal surface treatment method according to the embodiment may be simultaneously applied to a metal material including a plurality of metal base materials, such as iron-based base materials, aluminum-based base materials, and zinc-based base materials. In particular, on the body and parts of an automobile including various metal materials such as iron, zinc, and aluminum, the metal surface treatment method of the embodiment forms a chemical conversion coating film having sufficient base metal concealing properties and adhesiveness, and thereby imparts favorable corrosion resistance to them.

Iron-based base materials used as a metal material according to the embodiment are not particularly limited, and examples thereof include cold-rolled steel and hot-rolled steel. The aluminum-based base materials are also not particularly limited, and examples thereof include 5000 series aluminum alloy, 6000 series aluminum alloy, and aluminum-coated steel plates treated by aluminum-based electroplating, hot dipping, or vapor deposition plating. Zinc-based base materials are also not particularly limited, and examples thereof include zinc or zinc-based alloy coated steel plates treated by zinc-based electroplating, hot dipping, or vapor deposition plating, such as zinc coated steel plate, zinc-nickel coated steel plate, zinc-iron coated steel plate, zinc-chromium coated steel plate, zinc-aluminum coated steel plate, zinc-titanium coated steel plate, zinc-magnesium coated steel plate, and zinc-manganese coated steel plate. High tensile steel plates are available in various grades depending on strength and manufacturing process, and examples thereof include JSC440J, 440P, 440W, 590R, 590T, 590Y, 780T, 780Y, 980Y, and 1180Y.

[Amount of Surface Treatment Film]

For the purpose of improving the corrosion resistance of an iron-based metal material such as a cold-rolled steel, hot-rolled steel, cast iron, and sintered material, and forming a uniform surface treatment film to achieve favorable adhesiveness, the surface treatment coating layer formed on the surface of the iron-based metal material preferably contains 10 mg/m$^2$ or more of zirconium element and/or titanium element and 0.5 mg/m$^2$ or more of silicon element. The surface treatment coating layer more preferably contains 20 mg/m$^2$ or more of zirconium element and/or titanium element and 1 mg/m$^2$ or more of silicon element, and further preferably contains 30 mg/m$^2$ or more of zirconium element and/or titanium element and 1.5 mg/m$^2$ or more of silicon element.

Further, for the purpose of forming a uniform chemical conversion coating film for achieving favorable adhesiveness to impart favorable corrosion resistance to a zinc-based metal material such as a galvanized or zinc coated steel plate and an alloyed galvanized steel plate, the surface treatment coating layer formed on the surface of the zinc-based metal material preferably contains 10 mg/m$^2$ or more of zirconium and/or titanium with respect to the metal element and 0.5 mg/m$^2$ or more of silicon element. The surface treatment coating layer more preferably contains 20 mg/m$^2$ or more of zirconium element and/or titanium element and 1 mg/m$^2$ or more of silicon element, and further preferably contains 30 mg/m$^2$ or more of zirconium element and/or titanium element and 1.5 mg/m$^2$ or more of silicon element.

Furthermore, for the purpose of forming a uniform chemical conversion coating film for achieving favorable adhesiveness to impart favorable corrosion resistance to an aluminum-based metal material such as an aluminum casting and aluminum alloy plate, the surface treatment coating layer formed on the surface of the aluminum-based metal material preferably contains 5 mg/m$^2$ or more of zirconium element and/or titanium elements and 0.5 mg/m$^2$ or more of silicon element. The surface treatment coating layer more preferably contains 10 mg/m$^2$ or more of zirconium element and/or titanium element and 1 mg/m$^2$ or more of silicon element.

Furthermore, for the purpose of forming a uniform chemical conversion coating film for achieving favorable adhesiveness to impart favorable corrosion resistance to an magnesium-based metal material such as a magnesium alloy plate and magnesium casting, the surface treatment coating layer formed on the surface of the magnesium-based metal material preferably contains 5 mg/m$^2$ or more of zirconium element and/or titanium elements and 0.5 mg/m$^2$ or more of silicon element. The surface treatment coating layer more preferably contains 10 mg/m$^2$ or more of zirconium element and/or titanium element and 1 mg/m$^2$ or more of silicon element.

For any metal materials, there is no particular upper limit for the amount of the surface treatment coating layer, but if the amount is excessive, the surface treatment coating layer tends to cause cracking, which hinders the formation of a uniform film. Accordingly, the amount of the surface treatment film formed by the metal surface treatment method of the embodiment preferably contains 1 g/m$^2$ or less, more preferably 800 mg/m$^2$ or less of zirconium and/or titanium with respect to the metal element.

Furthermore, for any metal materials, the mass ratio of the zirconium element and/or titanium element to the silicon element in the surface treatment film is preferably from 0.5 to 50. If the mass ratio is less than 0.5, corrosion resistance and adhesiveness cannot be achieved. If the mass ratio is more than 50, the surface treatment coating layer tends to cause cracking, which hinders the formation of a uniform film.

[Pretreatment of Metal Material]

The metal material according to the embodiment is preferably a metal material which has been cleansed by degreasing treatment. After the degreasing treatment, the metal material of the embodiment is preferably subjected to water washing treatment. The degreasing treatment and water washing treatment are conducted for removing oil and stains from the surface of the metal material. In usual cases, immersion treatment is conducted for several minutes at a temperature from 30° C. to 55° C. using a degreasing agent such as a phosphate-free and nitrogen-free degreasing detergent. If desired, preliminary degreasing treatment may be conducted before the degreasing treatment. Furthermore, for removing the degreasing agent, water washing treatment is conducted after the degreasing treatment at least once by spray treatment with a large amount of washing water.

As described above, in the case where the metal surface treatment composition includes the surfactant, a favorable film is formed with no necessity of degreasing and cleansing of the metal material in advance. More specifically, in such a case, degreasing treatment of the metal material is simultaneously achieved in the treatment solution contact step.

[Aftertreatment of Metal Material]

A metal material having formed thereon a chemical conversion coating film by the metal surface treatment method according to the embodiment is preferably subjected to water washing treatment before the subsequent formation of a coating film. More specifically, the metal surface treatment method according to the embodiment includes a treatment solution contact step of contacting a metal surface treatment solution containing the metal surface treatment composition with the metal material, and a water washing step of washing the metal material with water after the treatment solution contact step. Impurities on the surface of the chemical conversion coating film are removed by the water washing treatment before the formation of a coating film, which further improves the adhesiveness to a coating film to offer favorable corrosion resistance.

The chemical conversion coating film formed by the metal surface treatment method according to the embodiment includes organosiloxane formed by the poly-condensation of organosilane, and thus, may be subjected to water washing treatment before the formation of a coating film. More specifically, organosilane can be removed by water washing treatment, but polymerized organosiloxane will not be removed because it strongly interacts with hydroxides or oxides of zirconium and/or titanium constituting the chemical conversion coating film. Accordingly, the chemical conversion coating film formed by the metal surface treatment method according to the embodiment will not lose its adhesiveness by water washing treatment.

In the water washing treatment after the surface treatment, the final water washing is preferably conducted with pure water. The water washing treatment after the surface treatment may be spray water washing, immersion water washing, or a combination thereof.

Following the water washing treatment after the surface treatment, drying may be conducted as necessary in accordance with a known method, but in the case where a chemical conversion coating film is formed by the metal surface treatment method according to the embodiment, the film may be coated after water washing treatment with no necessity for drying treatment. More specifically, the formation of a chemical conversion coating film by the metal surface treatment method according to the embodiment could be followed by coating by a wet and wet coating method. Accordingly, the metal surface treatment method according to the embodiment allows for the reduction of the surface treatment process for metal materials before electro-deposition coating, such as an automobile body, body shell of a two-wheel vehicle or the like, various parts, and the like before electro-deposition coating.

[Subsequently Formed Coating Film]

Following the formation of a chemical conversion coating film by the metal surface treatment method according to the embodiment, a coating film is formed on the chemical conversion coating film, and examples thereof include coating films formed by conventionally known paints such as an electro-deposition paint, solvent paint, aqueous paint, and powder paint.

Among these paints, electro-deposition paint, particularly cationic electro-deposition paint, is preferable for forming a coating film. The reason is that the cationic electro-deposition paint usually includes a resin having a functional group which exhibits reactivity or compatibility with amino groups, and hence, it acts on the organosiloxane having amino groups contained in the metal surface treatment composition as a chemical conversion treatment agent to further improve the adhesiveness between the electro-deposition coating film and the chemical conversion coating film. The cation electro-deposition paint is not particularly limited, and examples thereof include known cationic electro-deposition paints such as an aminated epoxy resin, aminated acrylic resin, and sulfonated epoxy resin.

Following the water washing step of washing the metal material with water after the treatment solution contact step of contacting the metal surface treatment solution containing the metal surface treatment composition according to the embodiment, or following electrolytic treatment by contact, the metal material may be contacted with an acidic aqueous solution containing at least one selected from the group consisting of cobalt, nickel, tin, copper, titanium, and zirconium. More specifically, the metal surface treatment method according to the embodiment may include, following the water washing step of washing with water the metal material after the treatment solution contact step, an acid contact step of contacting the metal material with an acidic aqueous solution containing at least one selected from the group consisting of cobalt, nickel, tin, copper, titanium, and zirconium. This further improves the corrosion resistance.

The supply source of at least one metal element selected from the group consisting of cobalt, nickel, tin, copper, titanium and zirconium is not particularly limited. Preferable examples thereof include oxides, hydroxides, chlorides, nitrates, oxynitrates, sulfates, oxysulfates, carbonates, oxycarbonates, phosphates, oxyphosphates, oxalates, oxyoxalates, and organic metal compounds of the metal elements which are readily available.

The acidic aqueous solution containing the metal elements preferably has a pH of 2 to 6. The pH of the acidic aqueous solution may be adjusted with an acid such as phosphoric acid, nitric acid, sulfuric acid, hydrofluoric acid, hydrochloric acid, and organic acid, and alkali such as sodium hydroxide, potassium hydroxide, lithium hydroxide, alkali metal salt, ammonia, ammonium salt, and amine.

Following the water washing step of washing the metal material with water after the treatment solution contact step of contacting the metal surface treatment solution containing the metal surface treatment composition according to the embodiment with the metal material, or following electrolytic treatment by contact, the metal material may be contacted with a polymer-containing solution which contains at least one of a water-soluble polymer compound and water-dispersible polymer compound. More specifically, the metal surface treatment method according to the embodiment may include, following the water washing step of washing with water the metal material after the treatment solution contact step, a polymer-containing solution contact step of contacting the metal material with a polymer-containing solution which contains at least one of a water-soluble polymer compound and water-dispersible polymer compound. This further improves corrosion resistance.

The water-soluble polymer compound and water-dispersible polymer compound are not particularly limited, and examples thereof include polyvinyl alcohol, poly(meth)acrylic acid, copolymer of acrylic acid and methacrylic acid, copolymers of ethylene and acrylic monomer such as (meth)acrylic acid and (meth)acrylate, copolymer of ethylene and vinyl acetate, polyurethane, aminomodified phenolic resin, polyester resin, epoxy resin, tannin, tannic acid and its salts, and phytic acid.

EXAMPLES

The invention is further illustrated by the following Examples and Comparative Examples, but the invention should not be limited to them. The blending quantity represents parts by mass unless otherwise noted.

Example 1

A commercial cold-rolled steel sheet (SPC, Manufactured by Nippon Testpanel Co., Ltd., 70 mm×150 mm×0.8 mm) was prepared as a metal material.

[Pretreatment of Metal Material Before Chemical Conversion Treatment]

[Degreasing Treatment]

Specifically, the metal material was subjected to degreasing treatment at 40° C. for two minutes using "SURF-CLEANER EC92" (manufactured by Nippon Paint Co., Ltd.) as an alkali degreasing treatment agent.

[Water Washing Treatment after Degreasing Treatment]

Following the degreasing treatment, the metal material was subjected to immersion washing in a water-washing bath, followed by spray washing with tap water for about 30 seconds.

[Chemical Conversion Treatment]

[Generation of Organosilane Polycondensate]

In this example, 30 parts by mass of KBE903 (3-aminopropyl-triethoxysilane, effective concentration 100%, manufactured by Shin-Etsu Chemical Co., Ltd.) as organosilane were uniformly dropped from a dropping funnel over a period of 60 minutes into a mixed solvent of 70 parts by mass of deionized water and 70 parts by mass of isopropyl alcohol (solvent temperature: 25° C.), and then allowed to react at 25° C. for 24 hours in a nitrogen atmosphere. Thereafter, the reaction solution was depressurized to evaporate isopropyl alcohol, to thereby obtain a polycondensate of organosilane containing 30% by mass of the active ingredients (hereinafter referred to as KBE903 condensate (1)). Here, the term "active ingredients" refers to nonvolatile components.

Before the surface treatment (chemical conversion treatment) of the metal material, a metal surface treatment composition was prepared. Specifically, a metal surface treatment composition was prepared using the previously prepared KBE903 condensate (1) and zircon hydrofluoric acid (reagent) as zirconium in such a manner that the concentrations of zirconium and KBE903 condensate (1) were 200 ppm each. Subsequently, the metal element concentration in the metal surface treatment composition was measured with a plasma emission spectrophotometer (device name: (ICP) UPO-1 MARKII, manufactured by Kyoto-Koken Inc.). On the basis of the measurements, the mass ratio (Zr/Si) of the zirconium element to the silicon element contained in the organosiloxane was determined and is shown in Table 1.

Furthermore, the Degree of polycondensation of organosilanes was evaluated by $^{29}Si$—NMR using FT-NMR (AVANCE 400 (400 MHz), manufactured by Bruker). More specifically, on the assumption that the detected $R^{13}$—Si $(OR^{14})_3$ ($R^{14}$ is —$CH_3$ or $C_2H_5$) or $R^{13}$—Si$(OH)_3$ is a monomer and the remainder is polycondensate, the Degree of polycondensation was determined by the above-mentioned formula (1). The results are shown in Table 3.

Furthermore, in the same manner, the ratio of silicon atoms which bind to two other silicon atoms, or which bind to three other silicon atoms, via oxygen atoms constituting the siloxane bond to the total amount of the silicon atoms in the organosiloxane and the unreacted organosilane, which are contained in the metal surface treatment composition was determined. The results are shown in Table 3.

Also, for the following Examples and Comparative Examples, the mass ratio of the zirconium element to the silicon element contained in organosiloxane and the Degree of polycondensation were determined, and the results are shown in Tables 1 to 4.

The prepared metal surface treatment composition was adjusted to pH 3.5 with a sodium hydrate aqueous solution, thus, prepared into a metal surface treatment solution. Also the concentration of free fluoride ions was adjusted to 5 ppm using the acidic sodium fluoride. The metal surface treatment solution was adjusted to a temperature of 30° C., in which the metal material washed with water was immersed for 60 seconds.

[Water Washing Treatment after Chemical Conversion Treatment]

The metal material after the chemical conversion treatment was subjected to spray treatment with tap water for 30 seconds, and then subjected to spray treatment with ion-exchanged water for ten seconds.

[Drying Treatment]

The metal material after the water washing treatment was dried in an electric drying oven at 80° C. for five minutes. The amount of the chemical conversion coating film (mg/m$^2$) was determined by measuring the content of Zr, Si, and C contained in the metal surface treatment composition using "XRF1700" (X-ray fluorescence spectrometer manufactured by Shimadzu Co., Ltd.). The results are shown in Table 3.

[Electro-Deposition Coating]

After the chemical conversion treatment and water washing treatment, the metal materials in a wet condition were each coated with "POWERNIX 110" (manufactured by Nippon Paint Co., Ltd.), a cationic electro-deposition paint, to form an electro-deposition coating film. The dry film thickness after the electro-deposition coating was 20 μm. Subsequently, each metal material was washed with water, and baked at 170° C. for 20 minutes to obtain test plates.

Example 2

In this example, 15 parts by mass of the KBE903 and 15 parts by mass of KBM603 (N-(2-aminoethyl)-3-aminopropyl-trimethoxysilane, effective concentration 100%, manufactured by Shin-Etsu Chemical Co., Ltd.) as organosilane were uniformly dropped from a dropping funnel over a period of 60 minutes into a solvent of 70 parts by mass of deionized water (solvent temperature: 25° C.), and then allowed to react at 25° C. for 24 hours in a nitrogen atmosphere to obtain a polycondensate of organosilane containing 30% by mass of active ingredients (hereinafter referred to as KBE903-KBM603 cocondensate (1)). A test plate was obtained in the same manner as Example 1 except that the KBE903-KBM603 cocondensate (1) was used to prepare the metal surface treatment composition in place of the KBE903 condensate (1).

Example 3

In this example, 15 parts by mass of the KBE903 and 15 parts by mass of the KBM603 were uniformly dropped from a dropping funnel over a period of 60 minutes into a mixed solvent of 70 parts by mass of deionized water and 70 parts by mass of ethanol (solvent temperature: 25° C.), and then allowed to react at 25° C. for 24 hours in a nitrogen atmosphere. Thereafter, the reaction solution was depressurized to evaporate ethanol, thereby to obtain a polycondensate of organosilane containing 30% by mass of active ingredients (hereinafter referred to as KBE903-KBM603 cocondensate (2)). A test plate was obtained in the same manner as Example 1 except that the KBE903-KBM603 cocondensate (2) was used to prepare the metal surface treatment composition in place of the KBE903 condensate (1).

Example 4

In this example, 20 parts by mass of the KBE903 as organosilane were uniformly dropped from a dropping funnel over a period of 60 minutes into a solvent of 70 parts by mass of deionized water (solvent temperature: 25° C.), and then allowed to react at 25° C. for 24 hours in a nitrogen atmosphere to obtain a polycondensate of organosilane containing 20% by mass of active ingredients. A test plate was obtained in the same manner as Example 1 except that the polycondensate of organosilane obtained herein was used to prepare the metal surface treatment composition in place of the KBE903 condensate (1).

Example 5

In this example, 5 parts by mass of the KBE903 as organosilane were uniformly dropped from a dropping funnel over a period of 60 minutes into a solvent of 95 parts by mass of deionized water (solvent temperature: 25° C.), and then allowed to react at 25° C. for 24 hours in a nitrogen atmosphere to obtain a polycondensate of organosilane containing 5% by mass of active ingredients. A test plate was obtained in the same manner as Example 1 except that the polycondensate of organosilane obtained herein was used to prepare the metal surface treatment composition in place of the KBE903 condensate (1).

Example 6

In this example, 15 parts by mass of the KBE903 as organosilane and 15 parts by mass of KBM403 (3-glycidoxypropyltrimethoxysilane, effective concentration 100%, manufactured by Shin-Etsu Chemical Co., Ltd.) were uniformly dropped from a dropping funnel over a period of 60 minutes into a mixed solvent of 70 parts by mass of deionized water and 70 parts by mass of ethanol (solvent temperature: 25° C.), and then allowed to react at 25° C. for 24 hours in a nitrogen atmosphere. Thereafter, the reaction solution was depressurized to evaporate ethanol, to thereby obtain a polycondensate of organosilane containing 30% by mass of active ingredients. A test plate was obtained in the same manner as Example 1 except that the polycondensate of organosilane containing 30% by mass of active ingredients obtained herein was used to prepare the metal surface treatment composition in place of the KBE903 condensate (1).

Example 7

In this example, 30 parts by mass of KBM903 as organosilane were uniformly dropped from a dropping funnel over a period of 60 minutes into a solvent of 70 parts by mass of deionized water (solvent temperature: 25° C.), and then allowed to react at 25° C. for 24 hours in a nitrogen atmosphere to obtain a polycondensate of organosilane containing 30% by mass of active ingredients (hereinafter referred to as KBE903 condensate (2)). A test plate was obtained in the same manner as Example 1 except the KBM903 condensate (2) was used to prepare the metal surface treatment composition in place of the KBE903 condensate (1), and SNOWTEX N (colloidal silica, manufactured by Nissan Chemical Industries, Ltd.) was added to the metal surface treatment composition in such a manner that the metal surface treatment composition contained 50 ppm of colloidal silica.

Example 8

In this example, 30 parts by mass of KBE903 as organosilane were uniformly dropped from a dropping funnel over a period of 60 minutes into a solvent of 70 parts by mass of deionized water (solvent temperature: 25° C.), and then allowed to react at 25° C. for 24 hours in a nitrogen atmosphere to obtain a polycondensate of organosilane containing 30% by mass of active ingredients (hereinafter referred to as KBE903 condensate (2)). A test plate was obtained in the same manner as Example 1 except that the KBE903 condensate (2) was used to prepare the metal surface treatment composition in place of the KBE903 condensate (1).

Example 9

A test plate was obtained in the same manner as Example 7 except that PAA-10C (polyallylamine, effective concentration 10%, manufactured by Nitto Boseki Co., Ltd.) was added to the metal surface treatment composition in place of the SNOWTEX N in such a manner that the metal surface treatment composition contained 20 ppm of polyallylamine.

Example 10

A test plate was obtained in the same manner as Example 7 except that nitric acid (reagent) as an oxidizing agent was added to the metal surface treatment composition in place of the SNOWTEX N in such a manner that the metal surface treatment composition contained 3000 ppm of nitric acid.

Example 11

A test plate was obtained in the same manner as Example 7 except that aluminum nitrate (reagent) and hydrofluoric acid (reagent) were added to the metal surface treatment composition in place of the SNOWTEX N in such a manner that the metal surface treatment composition contained 500 ppm of aluminum nitrate and 1000 ppm of hydrofluoric acid.

Example 12

A test plate was obtained in the same manner as Example 7 except that RESITOP PL4012 (phenolic resin, manufactured by Gun Ei Chemical Co., Ltd.) was added to the metal surface treatment composition in place of the SNOWTEX N in such a manner that the metal surface treatment composition contained 200 ppm of the phenolic resin.

Example 13

A test plate was obtained in the same manner as Example 3 except that ADEKATOL LB-83 (surfactant, manufactured by Asahi Denka Co., Ltd.) was added to the metal surface treatment composition in such a manner that the metal surface treatment composition contained 200 ppm of the surfactant.

Example 14

A test plate was obtained in the same manner as Example 1 except that a high tensile steel sheet (70 mm×150 mm×0.8 mm) was used as the metal material in place of the SPC.

Example 15

In this example, 20 parts by mass of the KBM603 as organosilane were uniformly dropped from a dropping funnel over a period of 60 minutes into a solvent of 80 parts by mass of deionized water (solvent temperature: 25° C.), and then allowed to react at 80° C. for 3 hours in a nitrogen atmosphere to obtain a polycondensate of organosilane containing 20% by mass of an active ingredient (hereinafter referred to as KBM603 condensate (1)). A test plate was obtained in the same manner as Example 1 except that the KBM603 condensate (1) was used to prepare the metal surface treatment composition in place of KBE903 condensate (1).

Example 16

In this example, 5 parts by mass of the KBM603 as organosilane were uniformly dropped from a dropping funnel over a period of 60 minutes into a mixed solvent of 95 parts by mass of deionized water and 95 parts by mass of ethanol (solvent temperature: 25° C.), and then allowed to react at 25° C. for 24 hours in a nitrogen atmosphere. Thereafter, the reaction solution was depressurized to evaporate ethanol, to thereby obtain a polycondensate of organosilane containing 5% by mass of active ingredients. A test plate was obtained in the same manner as Example 15 except that the polycondensate of organosilane containing 5% by mass of active ingredients obtained herein was used to prepare the metal surface treatment composition in place of KBM603 condensate (1).

Example 17

In this example, 10 parts by mass of the KBM603 and 10 parts by mass of KBM403 (3-grycidoxypropyltrimethoxysilane, effective concentration 100%, manufactured by Shin-Etsu Chemical Co., Ltd.) were uniformly dropped from dropping funnel over a period of 60 minutes into a solvent of 80 parts by mass of deionized water (solvent temperature: 25° C.), and then allowed to react at 80° C. for 3 hours in a nitrogen atmosphere to obtain a cocondensate of KBM603 and KBM403. A test plate was obtained in the same manner as Example 15 except that the cocondensate of organosilane containing 20% by mass of active ingredients was used to prepare the metal surface treatment composition in place of KBM603 condensate (1).

Example 18

A test plate was obtained in a same manner as Example 15 except that the metal surface treatment composition was prepared to adjust the concentration of zirconium to 3000 ppm, and the concentration of KBM603 (1) to 100 ppm.

Example 19

A test plate was obtained in a same manner as Example 15 except that a metal surface treatment composition was prepared to adjust the concentration of zirconium to 100 ppm, and the concentration of KBM603 (1) to 100 ppm.

Example 20

A test plate was obtained in a same manner as Example 15 except that copper nitrate was added to the metal surface treatment composition in such a manner that the metal surface treatment composition contained the 20 ppm of copper.

Example 21

In this example, 20 parts by mass of the KBE603 as organosilane were uniformly dropped from a dropping funnel over a period of 60 minutes into a solvent of 80 parts by mass of deionized water (solvent temperature: 25° C.), and then allowed to react at 80° C. for 3 hours in a nitrogen atmosphere to obtain a polycondensate of organosilane containing 20% by mass of active ingredients. A test plate was obtained in a same manner as Example 1 except that the polycondensate of organosilane containing 20% by mass of active ingredients was used to prepare the metal surface treatment composition in place of the KBE903 condensate (1), and tin sulfate was added to the metal surface treatment composition in such a manner that the metal surface treatment composition contained 20 ppm of tin.

Example 22

A test plate was obtained in a same manner as Example 1 except that copper sulfate and tin sulfate were added to the metal surface treatment composition in such a manner that the metal surface treatment composition contained 20 ppm of copper and 20 ppm of tin.

Example 23

A test plate was obtained in a same manner as Example 15 except that copper nitrate and aluminum nitrate were added to the metal surface treatment composition in place of tin sulfate, in such a manner that the metal surface treatment composition contained 20 ppm of copper and 100 ppm of aluminum.

Example 24

In this example, 50 parts by mass of the KBM603 as organosilane were uniformly dropped from a dropping funnel over a period of 60 minutes into a mixed solvent of 50 parts by mass of deionized water and 50 parts by mass of ethanol (solvent temperature: 25° C.) and then allowed to react at 25° C. for 24 hours in a nitrogen atmosphere to obtain a polycondensate of organosilane. A test plate was obtained in a same manner as Example 15 except the polycondensate of organosilane containing 50% by mass of active ingredients obtained herein was used to prepare the metal surface treatment composition in place of KBM603 condensate (1).

Example 25

In this example, 20 parts by mass of the KBM603 as organosilane were uniformly dropped from a dropping funnel over a period of 60 minutes into a solvent of 80 parts by mass of deionized water (solvent temperature: 25° C.), acetic acid was subsequently added to adjust the pH to 3 so that the organosilane condensate in a linear manner, and then allowed to react at 25° C. for 24 hours in a nitrogen atmosphere to obtain a polycondensate of organosilane containing 20% by mass of active ingredients. A test plate was obtained in a same manner as Example 15 except the polycondensate of organosilane containing 20% by mass of active ingredients obtained herein was used to prepare the metal surface treatment composition in place of the KBM603 condensate (1).

Example 26

In this example, 5 parts by mass of the KBM603 as organosilane were uniformly dropped from a dropping funnel over a period of 60 minutes into a solvent of 95 parts by mass of deionized water (solvent temperature: 25° C.), and then allowed to react at 80° C. for 3 hours in a nitrogen atmosphere to obtain polycondensate of organosilane containing 5% by mass of active ingredients. A test plate was obtained in a same manner as Example 15 except the polycondensate of organosilane containing 5% by mass of active ingredients obtained herein was used to prepare the metal surface treatment composition in place of the KBM603 condensate (1).

Comparative Example 1

A test plate was obtained in the same manner as Example 1 except that the metal surface treatment composition was prepared with no addition of the KBE903 condensate (1) prepared in Example 1.

Comparative Example 2

A test plate was obtained in the same manner as Example 1 except that the metal surface treatment composition was prepared in such a manner that the concentration of the KBE903 condensate (1) was not 200 ppm, but 5000 ppm.

Comparative Example 3

A test plate was obtained in the same manner as Example 1 except that the metal surface treatment composition was prepared with no addition of the KBE903 condensate (1) prepared in Example 1, and with the addition of magnesium nitrate(reagent) in such a manner that the concentration of magnesium nitrate was 200 ppm.

Comparative Example 4

A test plate was obtained in the same manner as Example 1 except that the metal surface treatment composition was prepared with no addition of the KBE903 condensate (1) prepared in Example 1, and with the addition of sodium nitrite (reagent) in such a manner that the concentration of sodium nitrite was 2000 ppm.

Comparative Example 5

A test plate was obtained in the same manner as Example 1 except that the KBM903 as organosilane was not polycondensed, and was used to prepare the metal surface treatment composition in place of KBM903 condensate (1).

Comparative Example 6

In this example, 30 parts by mass of KBM403 as organosilane were uniformly dropped from a dropping funnel over a period of 60 minutes into a solvent of 70 parts by mass of deionized water (solvent temperature: 25° C.), and then allowed to react at 25° C. for 24 hours in a nitrogen atmosphere to obtain a polycondensate of organosilane containing 30% by mass of active ingredients. A test plate was obtained in the same manner as Example 1 except that the polycondensate of organosilane obtained herein was used in place of the KBE903 condensate (1).

Comparative Example 7

A test plate was obtained in the same manner as Example 1 except that the KBE903 condensate prepared in Example 1 was not added, and RESITOP PL4012 (aminomodified phenolic resin, manufactured by Gun Ei Chemical Co., Ltd.) was added to the metal surface treatment composition in such a manner that the concentration of the solid content was 200 ppm.

Comparative Example 8

A test plate was obtained in the same manner as Example 1 except that the metal surface treatment composition was prepared with PAA-10C (polyallylamine, effective concentration 10%, manufactured by Nitto Boseki Co., Ltd.) in place of the KBE903 condensate (1).

Comparative Example 9

A test plate was obtained in the same manner as Example 1 except that the chemical conversion treatment was replaced with the zinc phosphate treatment as described below.

[Zinc Phosphate Treatment]

The cold-rolled steel sheet was used as a metal material, and the metal material after the degreasing treatment and water washing treatment was subjected to surface adjustment by immersion in 0.3% SURFFINE GL1 (surface adjusting agent manufactured by Nippon Paint Co., Ltd.) for 30 seconds at room temperature. Subsequently, the material was immersed in SURFDINE SD-6350 (zinc phosphate chemical conversion treatment agent manufactured by Nippon Paint Co., Ltd.) at 42° C. for two minutes.

Comparative Example 10

A test plate was obtained in the same manner as Example 7 except that a high tensile steel sheet (70 mm×150 mm×0.8 mm) was used as the metal material in place of the cold-rolled steel sheet.

Comparative Example 11

In this example, 2 parts by mass of the KBM903 as organosilane were uniformly dropped from a dropping funnel over a period of 60 minutes into a solvent of 98 parts by mass of deionized water (solvent temperature: 25° C.), and then allowed to react at 25° C. for 24 hours in a nitrogen atmosphere to obtain an organosilane polycondensate containing 2% by mass of active ingredients. A test plate was obtained in the same manner as Example 1 except that the organosilane polycondensate containing 2% by mass of active ingredient obtained herein was used in place of the KBE903 condensate (1).

Comparative Example 12

In this example, 1 part by mass of KBM603 as organosilane was uniformly dropped from a dropping funnel over a period of 60 minutes into a solvent of 99 parts by mass of deionized water (solvent temperature: 25° C.), and then allowed to react at 25° C. for 24 hours in a nitrogen atmosphere to obtain the organosilane polycondensate containing 1% by mass of active ingredient. A test plate was obtained in the same manner as Example 1 except that an organosilane polycondensate containing 1% by mass of active ingredient obtained herein was used in place of the KBE903 condensate (1).

Comparative Example 13

A test plate was obtained in the same manner as Example 1 except that XS1003 (N,N'-bis[3-trimethoxysilylpropyl]ethylenediamine, effective concentration 100%, manufactured by Chisso Corporation) as organosilane was used in place of the KBE903 condensate (1).

The test plates obtained in Examples and Comparative Examples were subjected to following tests. The results are shown in Tables 3 and 4.

TABLE 1

| | Metal material | Preparation Conditions | | | | | | Treatment Time (sec) |
|---|---|---|---|---|---|---|---|---|
| | | Zr (ppm) | Zr/Si | F (ppm) | pH | Organosiloxane (Organosilane added(ppm)) | Reaction Conditions (Solvent) | Other Additives (ppm) | |
| Example 1 | Cold Rolled Steel Sheet | 200 | 7.9 | 5 | 3.5 | KBE903(200) | 30% 25° C. × 24 h (water/IPA 1:1) | | 60 |
| Example 2 | Cold Rolled Steel Sheet | 200 | 8 | 5 | 3.5 | KBE903/KBM603 (1:1,200) | 30% 25° C. × 24 h (water) | | 60 |
| Example 3 | Cold Rolled Steel Sheet | 200 | 8 | 5 | 3.5 | KBE903/KBM603 (1:1,200) | 30% 25° C. × 24 h (water/ethanol 1:1) | | 60 |
| Example 4 | Cold Rolled Steel Sheet | 200 | 7.9 | 5 | 3.5 | KBE903(200) | 20% 80° C. × 3 h (water) | | 60 |
| Example 5 | Cold Rolled Steel Sheet | 200 | 8.1 | 5 | 3.5 | KBE903(200) | 5% 25° C. × 3 h (water) | | 60 |
| Example 6 | Cold Rolled Steel Sheet | 200 | 8.3 | 5 | 3.5 | KBE903/KBM403 (1:1,200) | 30% 25° C. × 24 h (water/ethanol 1:1) | | 60 |
| Example 7 | Cold Rolled Steel Sheet | 200 | — | 5 | 3.5 | KBE903(200) | 30% 25° C. × 24 h (water) | Collidal Silica(50) | 60 |
| Example 8 | Cold Rolled Steel Sheet | 200 | 6.4 | 5 | 3.5 | KBE903(200) | 30% 25° C. × 24 h (water) | | 60 |
| Example 9 | Cold Rolled Steel Sheet | 200 | 7.6 | 5 | 3.5 | KBE903(200) | 30% 25° C. × 24 h (water) | PAA(20) | 60 |
| Example 10 | Cold Rolled Steel Sheet | 200 | 7.9 | 5 | 3.5 | KBE903(200) | 30% 25° C. × 24 h (water) | Nitric Acid(3000) | 60 |
| Example 11 | Cold Rolled Steel Sheet | 200 | 8 | 5 | 3.5 | KBE903(200) | 30% 25° C. × 24 h (water) | Nitric Acid Al(500) HF(1000) | 60 |
| Example 12 | Cold Rolled Steel Sheet | 200 | 8 | 5 | 3.5 | KBE903(200) | 30% 25° C. × 24 h (water) | Phenolic Resin(200) | 60 |
| Example 13 | Cold Rolled Steel Sheet | 200 | 7.7 | 5 | 3.5 | KBE903/KBM603 (1:1,200) | 30% 25° C. × 24 h (water/ethanol 1:1) | Surfactant(200) | 60 |
| Example 14 | High Tensile Steel Sheet | 200 | 8.2 | 5 | 3.5 | KBE903(200) | 30% 25° C. × 24 h (water) | | 60 |
| Example 15 | Cold Rolled Steel Sheet | 200 | 8 | 5 | 3.5 | KBM603(200) | 20% 80° C. × 3 h (water) | | 60 |
| Example 16 | Cold Rolled Steel Sheet | 200 | 7.7 | 5 | 3.5 | KBM603(200) | 5% 25° C. × 24 h (water/ethanol 1:1) | | 60 |
| Example 17 | Cold Rolled Steel Sheet | 200 | 8.2 | 5 | 3.5 | KBM603/KBM403 (1:1,200) | 20% 80° C. × 3 h (water) | | 60 |
| Example 18 | Cold Rolled Steel Sheet | 3000 | 250 | 15 | 3.5 | KBM603(100) | 20% 80° C. × 3 h (water) | | 60 |
| Example 19 | Cold Rolled Steel Sheet | 100 | 0.8 | 4 | 3.5 | KBM603(1000) | 20% 80° C. × 3 h (water) | | 60 |
| Example 20 | Cold Rolled Steel Sheet | 200 | 7.8 | 5 | 3.5 | KBM603(200) | 20% 80° C. × 3 h (water) | Cu(20) | 60 |
| Example 21 | Cold Rolled Steel Sheet | 200 | 7.9 | 5 | 3.5 | KBE603(200) | 20% 80° C. × 3 h (water) | Sn(20) | 60 |
| Example 22 | Cold Rolled Steel Sheet | 200 | 8.1 | 5 | 3.5 | KBM603(200) | 20% 80° C. × 3 h (water) | Cu(20)Sn(20) | 60 |
| Example 23 | Cold Rolled Steel Sheet | 200 | 8 | 5 | 3.5 | KBM603(200) | 20% 80° C. × 3 h (water) | Cu(10)Al(100) | 60 |
| Example 24 | Cold Rolled Steel Sheet | 200 | 8 | 5 | 3.5 | KBM603(201) | 50% 25° C. × 24 h (water/ethenol 1:1) | | 60 |
| Example 25 | Cold Rolled Steel Sheet | 200 | 8.1 | 5 | 3.5 | KBM603(202) | 20% pH 3 25° C. × 24 h (water) | | 60 |
| Example 26 | Cold Rolled Steel Sheet | 200 | 8 | 5 | 3.5 | KBM603(200) | 5% 80° C. × 3 h (water) | | 60 |

TABLE 2

| | Metal Material | Preparation Conditions | | | | | | Treatment Time (sec) |
|---|---|---|---|---|---|---|---|---|
| | | Zr (ppm) | Zr/Si | F (ppm) | pH | Organosiloxane (Organosilane added(ppm)) | Reaction Conditions (Solvent) | Other Additives (ppm) | |
| Comparative Example 1 | Cold Rolled Steel Sheet | 200 | — | 5 | 3.5 | | | | 60 |
| Comparative Example 2 | Cold Rolled Steel Sheet | 200 | 0.31 | 5 | 3.5 | KBE903(5000) | 30% 25° C. × 24 h (water/IPA 1:1) | | 60 |
| Comparative Example 3 | Cold Rolled Steel Sheet | 200 | — | 5 | 3.5 | | | Nitric Acid Mg(200) | 60 |
| Comparative Example 4 | Cold Rolled Steel Sheet | 200 | — | 5 | 3.5 | | | Nitrous Acid Na(2000) | 60 |

TABLE 2-continued

| | Metal Material | Zr (ppm) | Zr/Si | F (ppm) | pH | Organosiloxane (Organosilane added(ppm)) | Reaction Conditions (Solvent) | Other Additives (ppm) | Treatment Time (sec) |
|---|---|---|---|---|---|---|---|---|---|
| Comparative Example 5 | Cold Rolled Steel Sheet | 200 | 8 | 5 | 3.5 | KBM903(200) | None | | 60 |
| Comparative Example 6 | Cold Rolled Steel Sheet | 200 | — | 5 | 3.5 | KBM403(200) | 30% 25° C. × 24 h (water) | | |
| Comparative Example 7 | Cold Rolled Steel Sheet | 200 | — | 5 | 3.5 | | | Amine Modified Phenol Resin(200) | 60 |
| Comparative Example 8 | Cold Rolled Steel Sheet | 200 | — | 5 | 3.5 | PAA10C(200) | | | 60 |
| Comparative Example 9 | Cold Rolled Steel Sheet | | | | | 0.3% SURFFINE GL1/SURFDINE 6350(Zinc Phosphate) | | | 120 |
| Comparative Example 10 | High Tensile Steel Sheet | | | | | 0.3% SURFFINE GL1/SUFDINE 6350(Zinc Phosphate) | | | 120 |
| Comparative Example 11 | Cold Rolled Steel Sheet | 200 | 7.5 | 5 | 3.5 | KBM903(200) | 2% 25° C. × 24 h (water) | | 60 |
| Comparative Example 12 | Cold Rolled Steel Sheet | 200 | 7.6 | 5 | 3.5 | KBM603(200) | 1% 25° C. × 24 h (water) | | 60 |
| Comparative Example 13 | Cold Rolled Steel Sheet | 200 | 7.1 | 5 | 3.5 | XS1003(200) | (Containing Methanol) | | 60 |

TABLE 3

| | Metal Material | Sludge Observation | Degree of Polycondensation (% by mass) | Ratio of Si binding to at least two Si (mole %) | Ratio of Si binding to at least three Si (mole %) | Amount of SPC Film ($g/m^2$) | | |
|---|---|---|---|---|---|---|---|---|
| | | | | | | Zr | Si | C |
| Example 1 | Cold Rolled Steel Sheet | a | 85 | 40 | 40 | 38 | 5.6 | 6.3 |
| Example 2 | Cold Rolled Steel Sheet | a | 90 | 40 | 50 | 34 | 4.6 | 5.2 |
| Example 3 | Cold Rolled Steel Sheet | a | 90 | 30 | 60 | 36 | 5.9 | 7.1 |
| Example 4 | Cold Rolled Steel Sheet | a | 75 | 40 | 30 | 33 | 3.3 | 3.9 |
| Example 5 | Cold Rolled Steel Sheet | b | 40 | 25 | 10 | 47 | 2.8 | 3.2 |
| Example 6 | Cold Rolled Steel Sheet | a | 90 | 40 | 50 | 45 | 3.6 | 4.2 |
| Example 7 | Cold Rolled Steel Sheet | b | 90 | 40 | 40 | 39 | 7.6 | 7.9 |
| Example 8 | Cold Rolled Steel Sheet | a | 90 | 40 | 40 | 37 | 5.2 | 6.6 |
| Example 9 | Cold Rolled Steel Sheet | a | 90 | 40 | 40 | 51 | 4.1 | 6.8 |
| Example 10 | Cold Rolled Steel Sheet | a | 90 | 40 | 40 | 49 | 5.8 | 6.6 |
| Example 11 | Cold Rolled Steel Sheet | b | 90 | 40 | 40 | 46 | 5.6 | 6.6 |
| Example 12 | Cold Rolled Steel Sheet | b | 90 | 40 | 40 | 36 | 3.9 | 4.7 |
| Example 13 | Cold Rolled Steel Sheet | a | 90 | 30 | 60 | 34 | 5.5 | 6.6 |
| Example 14 | High Tensile Steel Sheet | a | 90 | 40 | 40 | 51 | 6.1 | 7.2 |
| Example 15 | Cold Rolled Steel Sheet | a | 90 | 40 | 50 | 42 | 4.6 | 6.1 |
| Example 16 | Cold Rolled Steel Sheet | b | 80 | 50 | 30 | 38 | 3.3 | 3.7 |
| Example 17 | Cold Rolled Steel Sheet | a | 90 | 40 | 50 | 45 | 4.6 | 4.6 |
| Example 18 | Cold Rolled Steel Sheet | a | 90 | 60 | 20 | 82 | 3.1 | 3.6 |
| Example 19 | Cold Rolled Steel Sheet | b | 90 | 60 | 20 | 28 | 4.0 | 4.2 |
| Example 20 | Cold Rolled Steel Sheet | a | 90 | 60 | 20 | 57 | 4.8 | 5.3 |
| Example 21 | Cold Rolled Steel Sheet | a | 90 | 60 | 20 | 41 | 5.0 | 5.2 |

TABLE 3-continued

| | | | | | | | | |
|---|---|---|---|---|---|---|---|---|
| Example 22 | Cold Rolled Steel Sheet | a | 90 | 60 | 20 | 42 | 4.3 | 5.5 |
| Example 23 | Cold Rolled Steel Sheet | a | 90 | 60 | 20 | 39 | 4.5 | 3.9 |
| Example 24 | Cold Rolled Steel Sheet | a | 90 | 30 | 55 | 44 | 5.2 | 5.9 |
| Example 25 | Cold Rolled Steel Sheet | a | 90 | 70 | 20 | 42 | 3.3 | 3.6 |
| Example 26 | Cold Rolled Steel Sheet | a | 60 | 30 | 20 | 37 | 4.2 | 4.7 |

| | Film Zr/Si (wt ratio) | SDT Stripped Width (mm) Surface | SDT Stripped Width (mm) Edge | CCT (mm) | Durability (after standing for 30 days at 40° C.) Ratio of Si binding to at least two Si (mole %) | Durability SDT Stripped Width (mm) Surface | Durability SDT Stripped Width (mm) Edge | Storage Stability |
|---|---|---|---|---|---|---|---|---|
| Example 1 | 6.8 | 0.2 | none | 6.4 | 30 | 0.2 | none | b |
| Example 2 | 7.4 | 0.2 | none | 5.9 | 30 | 0.5 | none | a |
| Example 3 | 6.1 | none | none | 6.3 | 20 | none | none | a |
| Example 4 | 10 | 0.8 | 1.2 | 7.0 | 30 | 1.0 | 1.2 | b |
| Example 5 | 16.8 | 1.8 | 1.8 | 7.9 | | | | |
| Example 6 | 12.5 | none | 0.4 | 6.3 | 40 | none | 0.4 | a |
| Example 7 | 5.1 | 0.6 | 1.2 | 6.5 | | | | |
| Example 8 | 7.1 | 0.2 | none | 7.2 | | | | |
| Example 9 | 12.4 | none | none | 6.5 | | | | |
| Example 10 | 8.4 | none | none | 7.1 | | none | none | b |
| Example 11 | 8.2 | none | none | 6.6 | | none | none | b |
| Example 12 | 9.2 | 0.2 | none | 7.4 | | 1.0 | 0.5 | b |
| Example 13 | 6.2 | none | none | 6.3 | | none | none | b |
| Example 14 | 8.4 | 0.6 | 0.6 | 7.9 | | 1.0 | 0.5 | b |
| Example 15 | 9.1 | none | none | 6.3 | 40 | none | none | a |
| Example 16 | 11.5 | none | none | 7.0 | 50 | none | none | b |
| Example 17 | 9.8 | 0.2 | none | 7.8 | 40 | 0.2 | 0.5 | a |
| Example 18 | 26.5 | 1.7 | 1.5 | 7.5 | 50 | 1.5 | 1.5 | a |
| Example 19 | 7.0 | 1.8 | 1.3 | 7.9 | 50 | 0.2 | 0.5 | a |
| Example 20 | 11.9 | none | none | 4.2 | 50 | none | none | a |
| Example 21 | 8.2 | none | none | 4.8 | 50 | none | none | a |
| Example 22 | 9.8 | none | none | 4.0 | 50 | none | none | a |
| Example 23 | 8.7 | none | none | 4.8 | 50 | none | none | a |
| Example 24 | 8.5 | none | none | 4.0 | 30 | none | none | a |
| Example 25 | 12.7 | none | none | 4.7 | 60 | none | none | a |
| Example 26 | 8.8 | 0.2 | none | 6.6 | 30 | none | none | a |

TABLE 4

| | Metal Material | Sludge Observation | Degree of Polycondensation (% by mass) | Ratio of Si binding to at least two Si (mole %) | Ratio of Si binding to at least three Si (mole %) | Amount of SPC Film (g/m2) | | |
|---|---|---|---|---|---|---|---|---|
| | | | | | | Zr | Si | C |
| Comparative Example 1 | Cold Rolled Steel Sheet | b | — | — | — | 38 | — | — |
| Comparative Example 2 | Cold Rolled Steel Sheet | b | 85 | 30 | 55 | 18 | 3.2 | 4.5 |
| Comparative Example 3 | Cold Rolled Steel Sheet | b | — | — | — | — | — | — |
| Comparative Example 4 | Cold Rolled Steel Sheet | b | — | — | — | — | — | — |
| Comparative Example 5 | Cold Rolled Steel Sheet | b | 0 | 0 | 0 | 38 | 1.1 | 1.3 |
| Comparative Example 6 | Cold Rolled Steel Sheet | | 90 | — | — | 42 | 0.2 | 0.3 |
| Comparative Example 7 | Cold Rolled Steel Sheet | c | — | — | — | 35 | — | 5.2 |
| Comparative Example 8 | Cold Rolled Steel Sheet | b | — | — | — | 52 | — | 13.0 |
| Comparative Example 9 | Cold Rolled Steel Sheet | d | — | — | — | | 2 | |
| Comparative Example 10 | High Tensile Steel Sheet | d | — | — | — | | 2 | |
| Comparative Example 11 | Cold Rolled Steel Sheet | b | 25 | 15 | 0 | 35 | 1.2 | 1.5 |
| Comparative Example 12 | Cold Rolled Steel Sheet | b | 10 | 5 | 0 | 38 | 1.1 | 1.2 |
| Comparative Example 13 | Cold Rolled Steel Sheet | b | | | | 37 | 1.4 | 1.8 |

| | Film Zr/Si (wt ratio) | SDT Stripped Width (mm) | | CCT (mm) | Durability (after standing for 30 days at 40° C.) | | | |
|---|---|---|---|---|---|---|---|---|
| | | Surface | Edge | | Ratio of Si binding to at least two Si (mole %) | SDT Stripped Width (mm) | | Storage Stability |
| | | | | | | Surface | Edge | |
| Comparative Example 1 | — | 7.6 | 7.8 | 9.4 | | | | |
| Comparative Example 2 | 5.6 | 2.9 | 2.1 | 13.8 | 60 | 4.4 | 3.0 | b |
| Comparative Example 3 | — | 5.8 | 5.6 | 11.2 | | | | |
| Comparative Example 4 | — | 5.9 | 5.9 | 10.6 | | | | |
| Comparative Example 5 | 34.5 | 5.2 | 5.1 | 9.6 | | | | |
| Comparative Example 6 | 210 | 6.7 | 6.9 | 10.1 | | | | |
| Comparative Example 7 | — | 7.1 | 6.4 | 13.6 | | | | |
| Comparative Example 8 | — | 8.2 | 8.5 | 12.8 | | | | |
| Comparative Example 9 | — | 2.5 | 2.1 | 11.6 | | 2.4 | 2.3 | |
| Comparative Example 10 | — | 3.9 | 4.2 | 8.9 | | 3.3 | 3.8 | |
| Comparative Example 11 | 29.2 | 5.0 | 3.2 | 9.4 | 10 | | | |
| Comparative Example 12 | 34.5 | 5.2 | 3.0 | 9.5 | 20 | | | |
| Comparative Example 13 | 26.4 | 5.5 | 5.4 | 12.7 | | | | |

<Test>

[Secondary Adhesiveness Test (SDT)]

The test plates obtained in Examples and Comparative Examples were provided thereon with two lines of longitudinal parallel incisions extending to the base metal, and immersed in 5% by mass NaCl aqueous solution at 50° C. for 480 hours. Subsequently, the plates were subjected to water washing and air drying, and the incisions were sealed with an adhesive tape "L-PACK LP-24" (manufactured by Nichiban Co., Ltd.), and then the adhesive tape was abruptly stripped off. The maximum width of the paint sticking to the stripped adhesive tape was measured. The results are shown in Tables 3 and 4.

[Cycle Corrosion Test (CCT)]

The test plates obtained in Examples and Comparative Examples were sealed at their edges and back surface with a tape, and scratched with a cross cut pattern (scratch extending to the base metal) using a cutter, and subjected to CCT test under the following conditions. The results are shown in Tables 3 and 4.

[CCT Test Condition]

The test plates were sprayed with a 5% NaCl aqueous solution warmed to 35° C. for 2 consecutive hours in a salt spray tester kept at a temperature of 35° C. and a humidity of 95%, and dried for 4 hours under conditions having a temperature of 60° C. and a humidity of 20 to 30%, followed by standing for 2 hours under wet conditions having a temperature of 50° C. and a humidity of 95% or more. After repeating the cycle 200 times, the swelling width of the coating film was measured.

[Sludge Observation]

Chemical conversion treatment was conducted in Examples and Comparative Examples, and after standing for 30 days at room temperature, turbidity in the chemical conversion treatment agent (generation of sludge) was compared by visual observation, and workability was evaluated by the following criteria. The results are shown in Tables 3 and 4.

a: Transparent liquid.

b: Slightly clouded.

c: Clouded.

d: Precipitate (sludge) generated.

[Storage Stability]

The metal surface treatment compositions obtained in Examples and Comparative Examples were allowed to stand at 40° C. for 30 days, and the metal materials were subjected to chemical conversion treatment. The thus obtained chemical conversion coating films were measured for the content of Si, and the Si content was compared with the Si content in the case in which the metal surface treatment composition before standing was used.

Taking the Si content before standing as 100%, the Si content after standing was evaluated by the following criteria.

a: 80% or more b: 60 or more, and less than 80% c: 40 or more, and less than 60% d: less than 40%

A secondary adhesiveness test (SDT) was also conducted using the metal surface treatment compositions after standing under the same conditions as in the case of before standing.

As shown in Tables 3 and 4, Examples showed more favorable results in sludge observation, SDT, and CCT, and formed higher amounts of films than Comparative Examples. Accordingly, it has been indicated that the metal surface treatment composition according to the embodiment offers sufficient base metal concealing properties and coating film adhesiveness, and prevents corrosion. Furthermore, in Examples 2, 3, 6, and 15 to 26, in which an organosiloxane resistant to dissociation had been used, a sufficient chemical conversion coating film was formed on the surface of a metal material even after standing for 30 days, which indicates that the metal surface treatment compositions have higher storage stability than those in other Examples and Comparative Examples.

INDUSTRIAL APPLICABILITY

The metal material treated by the metal surface treatment method of the invention has sufficient base metal concealing properties, coating film adhesiveness, and corrosion resistance. Therefore, it is preferably used for applications followed by coating treatment, such as an automobile body before coating, body shell of a two-wheel vehicle or the like, various parts, outer surface of a container, and coil coating. Further, the metal surface treatment composition has good storage stability, and thus, is favorably used in the cases in which the metal surface treatment composition is repeatedly used, and most favorably used for surface treatment of large parts such as an automobile body where the treatment solution is required to have a long life.

The invention claimed is:

1. A metal surface treatment composition for use in metal surface treatment, containing
    at least one compound selected from the group consisting of a zirconium compound and a titanium compound; and
    an organosiloxane having at least two amino groups in an end terminal thereof, which is a polycondensate of an organosilane composition comprising organosilane wherein the organosilane has an amino group at an end thereof, and a silicon atom of a silyl group is linked to a nitrogen atom of the end amino group with four or more atoms in between,
    the Degree of polycondensation of the organosiloxane represented by the following formula (1) is at least 40%,
    the content of compound selected from at least one compound of the group consisting of the zirconium compound and titanium compound in the metal surface treatment composition is from 10 ppm to 10000 ppm with respect to the metal element,
    the content of the organosiloxane in the metal surface treatment composition is from 1 ppm to 2000 ppm with respect to the silicon element, and
    the mass ratio of at least one element selected from the group consisting of a zirconium element and a titanium element contained in the zirconium compound and the titanium compound, respectively, to a silicon element contained in the organosiloxane is from 0.5 to 500:

[Formula 1]

Degree of polycondensation %=mass of organosiloxane×100/(mass of unreacted organosilane+mass of organosiloxane)　　Formula (1)

wherein, the mass of organosiloxane refers to the mass of total of dimers and larger multimers of the organosilane, and does not include the mass of unreacted organosilane.

2. The metal surface treatment composition according to claim 1, wherein the mass ratio of total of trimers and larger multimers of the organosilane, to total of the unreacted organosilane and the dimmers of the organosilane, is greater than or equal to one in the organosiloxane.

3. The metal surface treatment composition according to claim 2, wherein the organosilane has two or more groups in total selected from amino groups and amino groups.

4. The metal surface treatment composition according to claim 1, wherein the organosilane has two or more groups in total selected from amino groups and imino groups.

5. The metal surface treatment composition according to any one of claim 1, wherein the organosiloxane is resistant to dissociation into organosilane.

6. The metal surface treatment composition according to claim 5, wherein the organosiloxane has one or more branched structure(s).

7. The metal surface treatment composition according to claim 5, wherein the ratio of silicon atoms bound to two or more other silicon atoms via oxygen atoms constituting the siloxane bond, to the total amount of silicon atoms in the organosiloxane and the unreacted organosilane contained in the metal surface treatment composition is at least 20 mole %, in the organosiloxane.

8. The metal surface treatment composition according to claim 7, wherein the ratio of silicon atoms which bound to at least three other silicon atoms via oxygen atoms constituting the siloxane bond, to the total amount of silicon atoms in the organosiloxane and the unreacted organosilane contained in metal surface treatment composition, is at least 10 mole %, in the organosiloxane.

9. The metal surface treatment composition according to claim 1, wherein the organosiloxane is a monocondensate or cocondensate of the organosilane.

10. The metal surface treatment composition according to claim 1, wherein the metal surface treatment composition has a pH from 1.5 to 6.5.

11. The metal surface treatment composition according to claim 1, further containing a fluorine compound, the content of free fluorine element in the metal surface treatment composition being from 0.01 ppm to 100 ppm.

12. The metal surface treatment composition according to claim 1, further containing at least one oxidizing agent selected from the group consisting of nitric acid, nitrous acid, sulfuric acid, sulfurous acid, persulfuric acid, phosphoric acid, carboxylic acid group-containing compound, sulfonic acid group-containing compound, hydrochloric acid, bromic acid, chloric acid, hydrogen peroxide, $HMnO_4$, $HVO_3$, $H_2WO_4$, $H_2MoO_4$, and salts thereof.

13. The metal surface treatment composition according to claim 1, further containing at least one metal element selected from the group consisting of magnesium, zinc, calcium, aluminum, gallium, indium, copper, iron, manganese, nickel, cobalt, cerium, strontium, rare earth elements, tin, bismuth, and silver.

14. The metal surface treatment composition according to claim 1, further containing at least one surfactant selected from the group consisting of nonionic surfactants, anionic surfactants, cationic surfactants, and ampholytic surfactants.

* * * * *